US012416757B2

(12) United States Patent
Virgen et al.

(10) Patent No.: US 12,416,757 B2
(45) Date of Patent: Sep. 16, 2025

(54) FRONT LIGHT FOR USE WITH REFLECTIVE DISPLAYS

(71) Applicant: Amazon Technologies, Inc., Seattle, WA (US)

(72) Inventors: Miguel Virgen, San Jose, CA (US); Thomas R. Hoffend, San Ramon, CA (US); Xiaolong Zheng, Newark, CA (US); Ahmed Hassan, San Jose, CA (US); Nageswara Rao Tadepalli, San Jose, CA (US); Bin Hou, San Jose, CA (US); Juho Ilkka Jalava, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/758,356

(22) Filed: Jun. 28, 2024

(65) Prior Publication Data

US 2025/0224552 A1 Jul. 10, 2025

Related U.S. Application Data

(60) Provisional application No. 63/619,097, filed on Jan. 9, 2024.

(51) Int. Cl.
*F21V 8/00* (2006.01)
*G02F 1/167* (2019.01)

(52) U.S. Cl.
CPC ......... *G02B 6/0068* (2013.01); *G02B 6/0036* (2013.01); *G02B 6/0073* (2013.01); *G02F 1/167* (2013.01)

(58) Field of Classification Search
CPC .. G02B 6/0068; G02B 6/0036; G02B 6/0073; G02F 1/167
See application file for complete search history.

(56) References Cited

U.S. PATENT DOCUMENTS

| 5,966,192 | A | * | 10/1999 | Higuchi | G02B 6/0053 362/626 |
|---|---|---|---|---|---|
| 9,261,639 | B1 | | 2/2016 | Tuohioja | |
| 11,079,630 | B1 | | 8/2021 | Sprague et al. | |

(Continued)

OTHER PUBLICATIONS

International Search Report and Written Opinion, Corresponding to International Application No. PCT/US2025/010755, dated May 6, 2025, pp. 1-20.

*Primary Examiner* — Mary Ellen Bowman
(74) *Attorney, Agent, or Firm* — Eversheds Sutherland (US) LLP

(57) ABSTRACT

Devices, systems, and methods are provided for a front light for use with reflective displays. A display device (such as an e-reader, for example) may include a light source and a light guide able to receive first light from the light source. The light guide includes a plurality of extraction features that control optimal movement of light emitted by the light source through a display stack of the display device. The extraction feature is provided in a wedge shape at an angle such that when light refracts from the extraction feature, it is directed towards the reflective LCD display at an incidence angle close to the display normal for the reflected light to exhibit similar properties as the reflected light from the EPD panel.

20 Claims, 20 Drawing Sheets

(56) References Cited

U.S. PATENT DOCUMENTS

| | | | |
|---|---|---|---|
| 11,668,975 B2* | 6/2023 | Walker | G02F 1/133603 |
| | | | 362/97.3 |
| 11,921,314 B2* | 3/2024 | Chang | G02B 5/0278 |
| 12,001,097 B2* | 6/2024 | Walker | G02F 1/133524 |
| 2006/0103777 A1* | 5/2006 | Ko | G02B 6/0053 |
| | | | 349/65 |
| 2006/0210726 A1* | 9/2006 | Jones | C08F 222/1025 |
| | | | 428/1.31 |
| 2009/0067178 A1* | 3/2009 | Huang | G02B 6/0065 |
| | | | 219/121.85 |
| 2009/0244714 A1* | 10/2009 | Chang | G02F 1/133606 |
| | | | 359/625 |
| 2009/0244737 A1* | 10/2009 | Chang | G02B 5/045 |
| | | | 359/831 |
| 2010/0302798 A1 | 12/2010 | Papakonstantinou et al. | |
| 2010/0302802 A1 | 12/2010 | Bita et al. | |
| 2011/0051047 A1* | 3/2011 | O'Neill | G02B 6/0096 |
| | | | 349/67 |
| 2013/0343086 A1 | 12/2013 | Kim et al. | |
| 2015/0293272 A1* | 10/2015 | Pham | G02B 5/0268 |
| | | | 205/95 |
| 2019/0108786 A1* | 4/2019 | Lee | G02B 5/0278 |
| 2021/0373225 A1 | 12/2021 | Yao et al. | |
| 2023/0229040 A1* | 7/2023 | Park | G02B 6/0053 |
| | | | 362/97.1 |

* cited by examiner

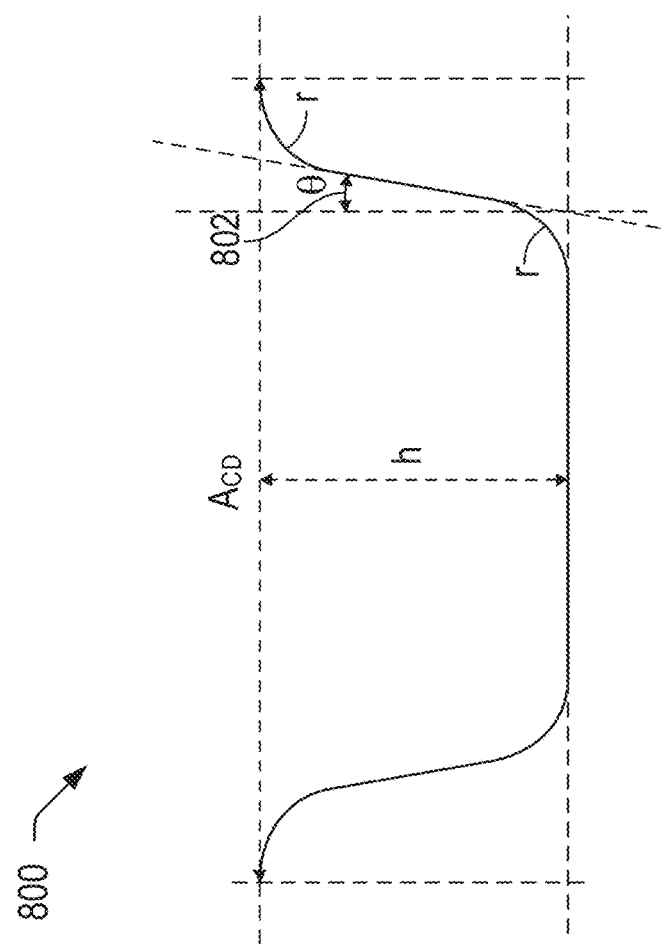
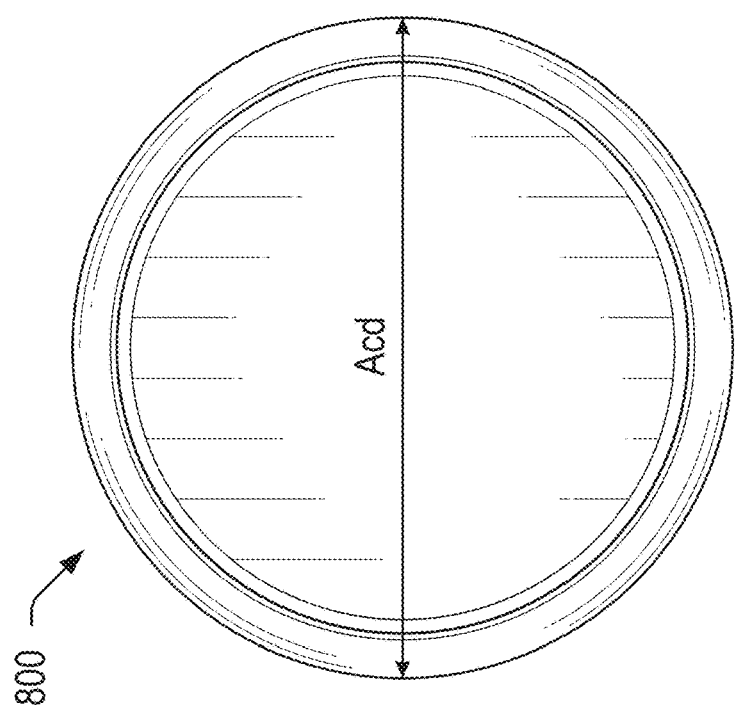
FIG. 8B
FIG. 8A

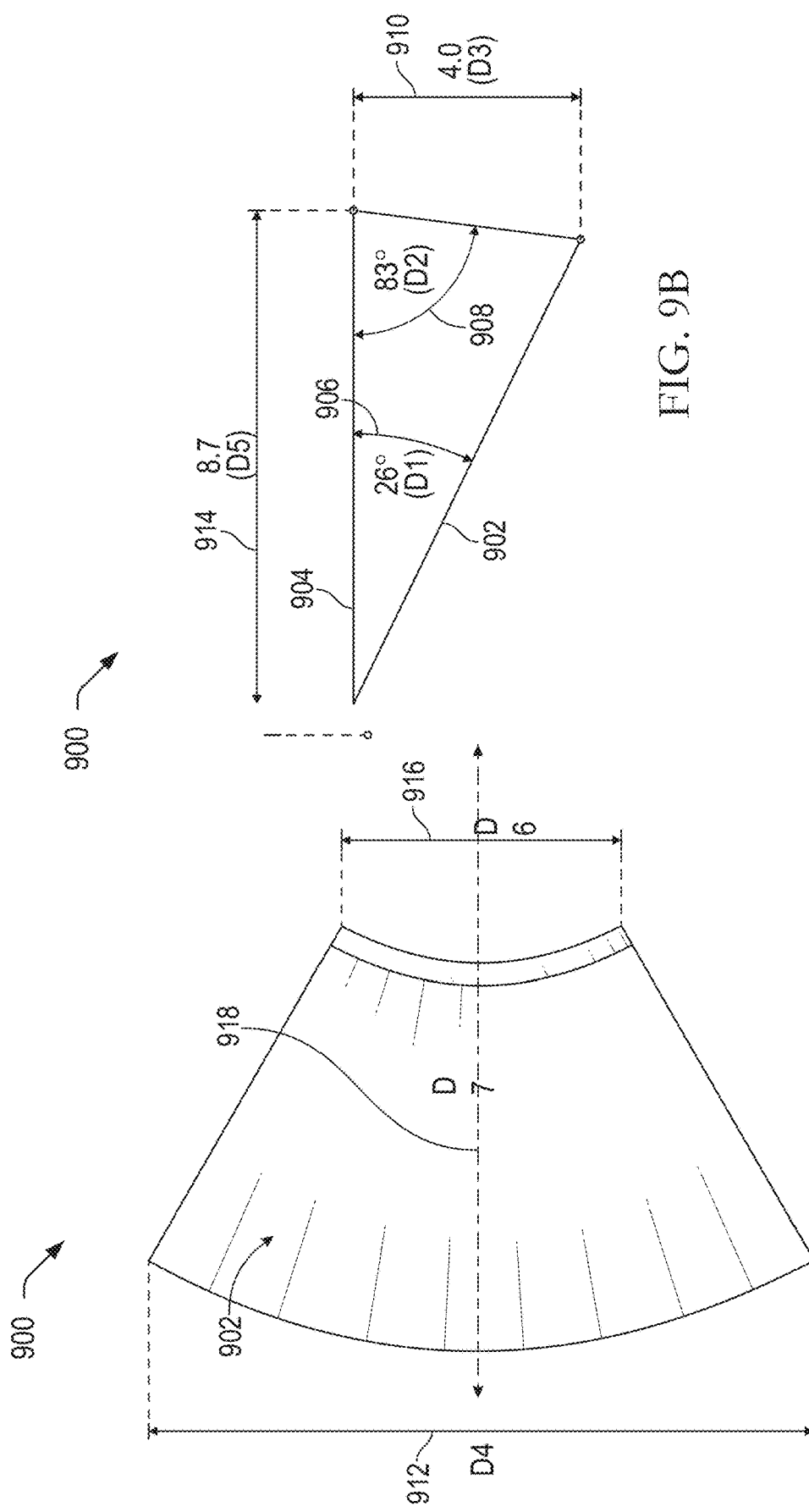

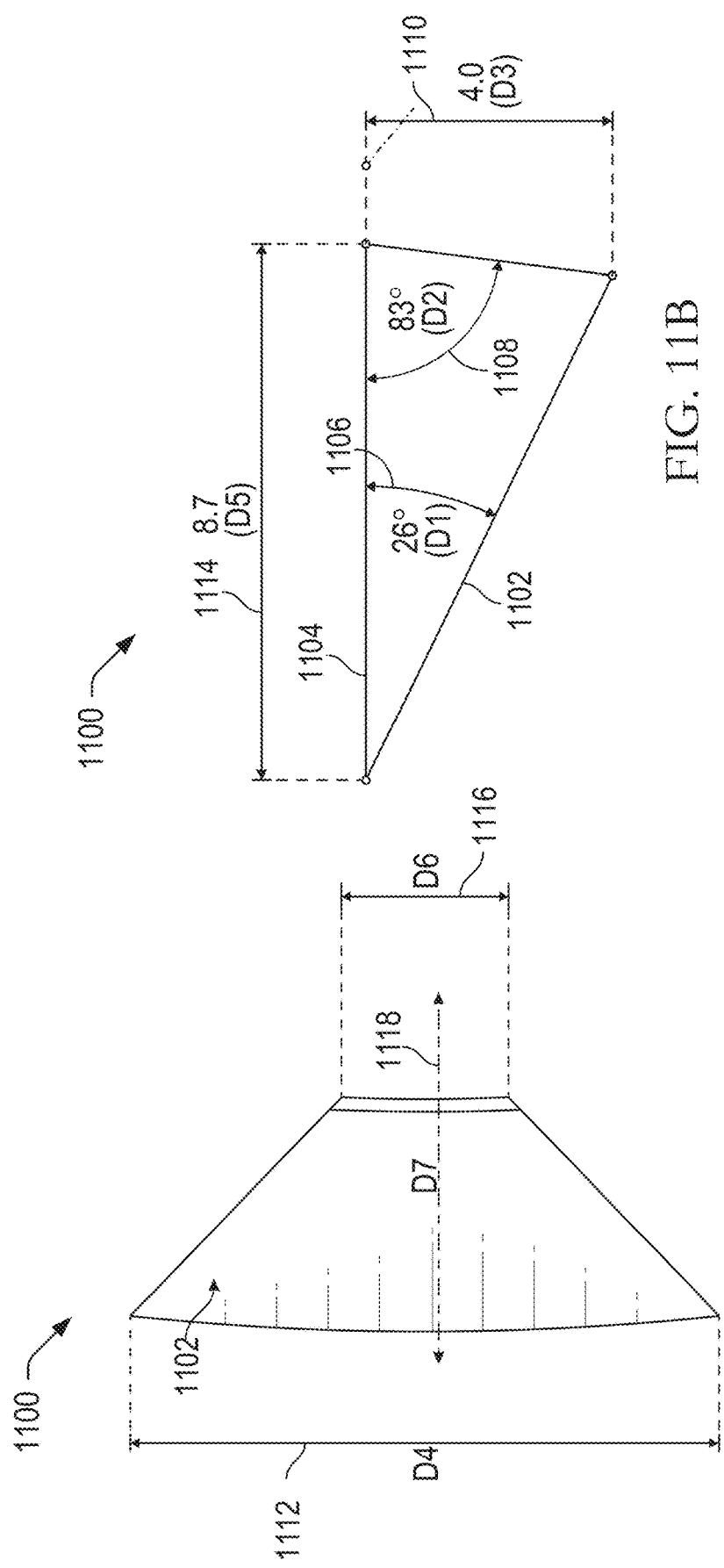

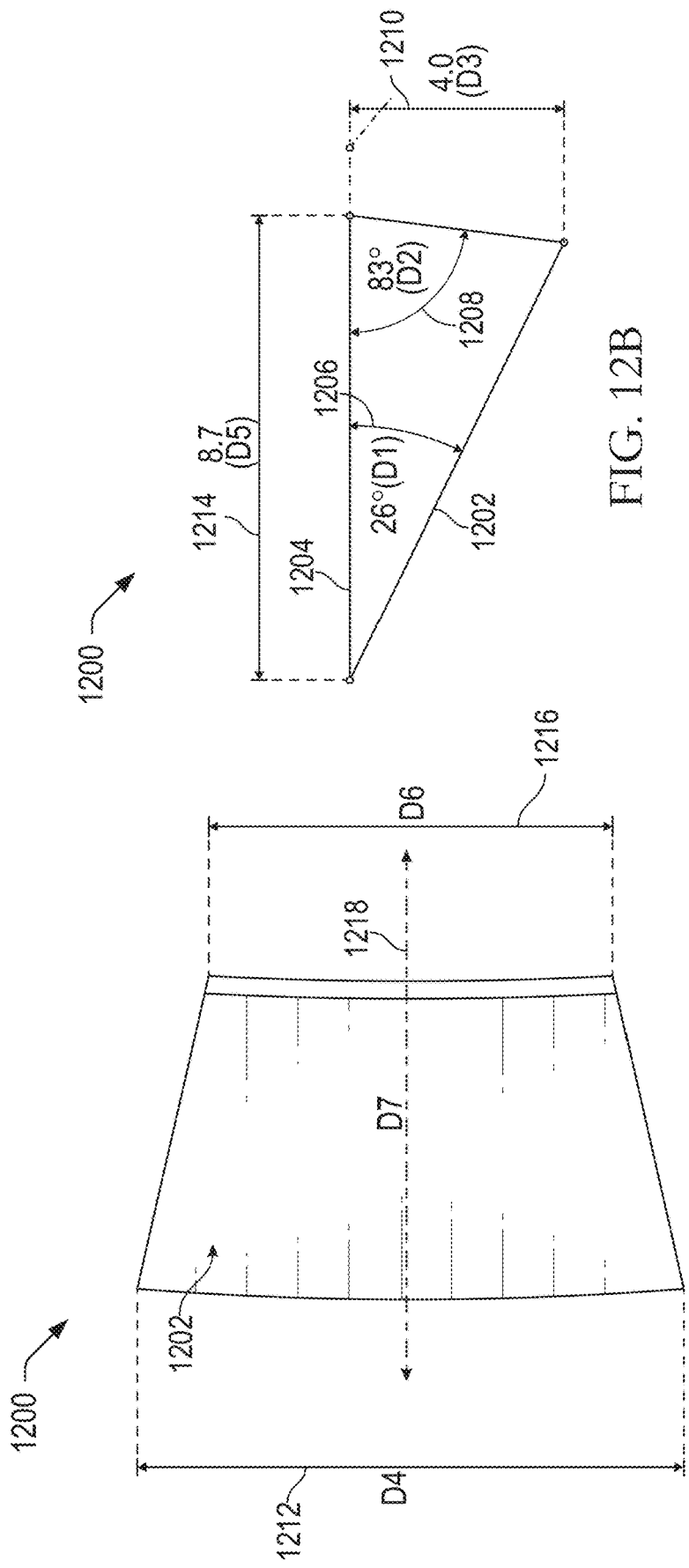

FRONT LIGHT FOR USE WITH REFLECTIVE DISPLAYS

CROSS REFERENCE TO RELATED APPLICATION(S)

This application claims priority to and benefit of U.S. provisional patent application No. 63/619,097 filed Jan. 9, 2024, the disclosure of which is incorporated herein by reference in its entirety.

BACKGROUND

A variety of devices, such as electronic book ("e-Book") reader devices, desktop computers, portable computers, smartphones, tablet computers, game consoles, televisions, and so forth are used to access various forms of content. These devices may include electrophoretic displays (EPD) or reflective liquid crystal displays (LCD).

BRIEF DESCRIPTION OF THE DRAWINGS

FIG. 8A illustrates a bottom-up view of an extraction feature of a light guide, in accordance with one or more example embodiments of the present disclosure.

FIG. 8B illustrates a cross-section view of the extraction feature of FIG. 8A, in accordance with one or more example embodiments of the present disclosure.

FIG. 9A illustrates a bottom-up view of another extraction feature of a light guide of the device of FIG. 1, in accordance with one or more example embodiments of the present disclosure.

FIG. 9B illustrates a cross-section view of the extraction feature of FIG. 9A, in accordance with one or more example embodiments of the present disclosure.

FIG. 11A illustrates a bottom-up view of another extraction feature of a light guide of the device of FIG. 1, in accordance with one or more example embodiments of the present disclosure.

FIG. 11B illustrates a cross-section view of the extraction feature of FIG. 11A, in accordance with one or more example embodiments of the present disclosure.

FIG. 12A illustrates a bottom-up view of another extraction feature of a light guide of the device of FIG. 1, in accordance with one or more example embodiments of the present disclosure.

FIG. 12B illustrates a cross-section view of the extraction feature of FIG. 12A, in accordance with one or more example embodiments of the present disclosure.

DETAILED DESCRIPTION

Figure 1:
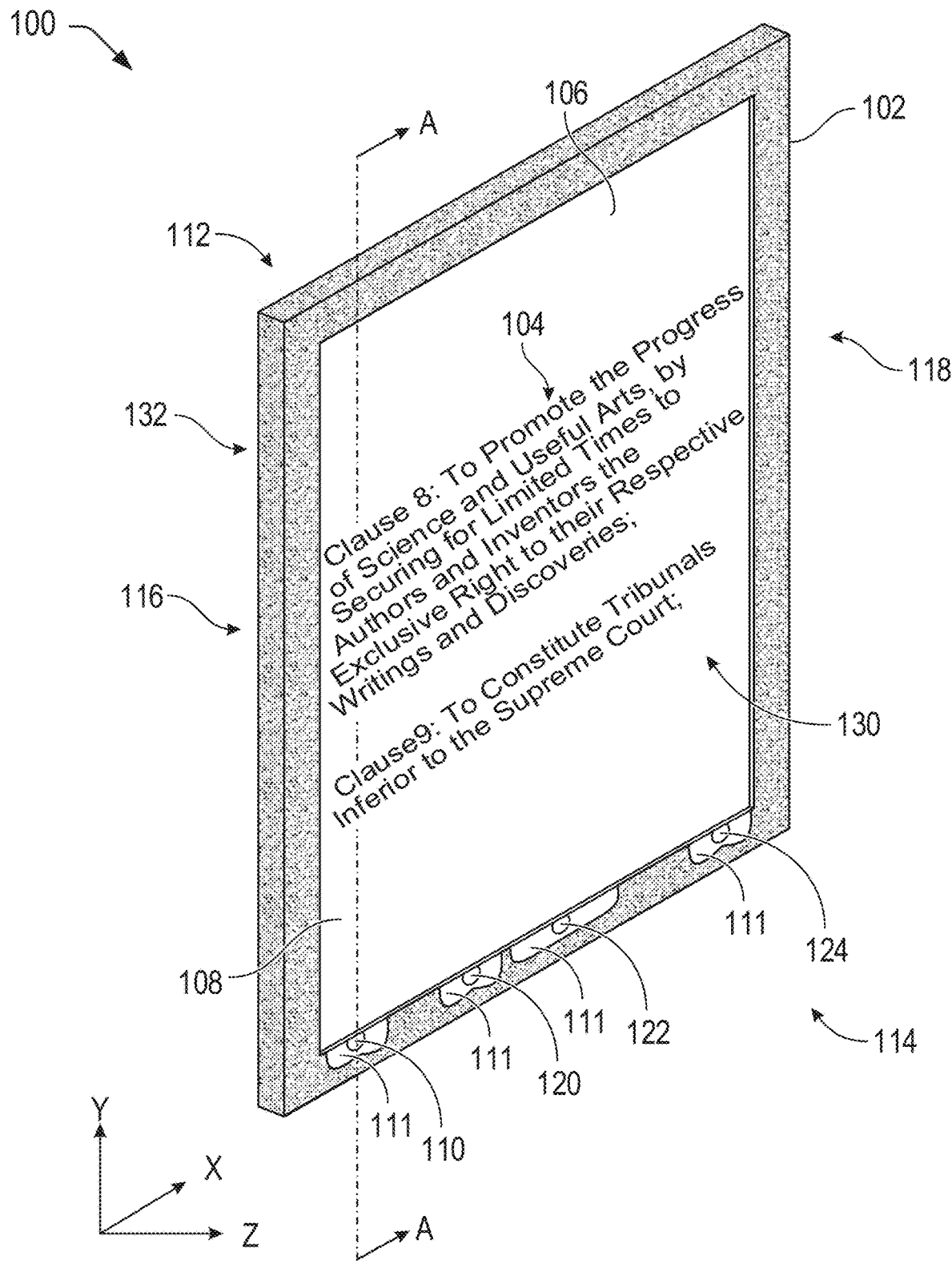
FIG. 1 illustrates a system for presenting content using a device, in accordance with one or more example embodiments of the present disclosure.

Example embodiments described herein provide certain systems, methods, and devices for a front light for use with reflective displays. Particularly, an improved front lit display device (such as an e-reader, for example) is provided that includes a light guide with extraction features shaped such that light emitted by a light source (such as light emitting diodes (LEDs), for example) of the display device travels through an optimal path within a display stack of the display device, while also maintaining a sufficient contrast ratio (CR) and other important properties to ensure an optimal viewing experience. An extraction feature may be an element (such as an air pocket or material provided in a particular pattern at the light guide and/or an interface of the light guide) that reflects or refracts light to modify the direction of the light within the display stack of the display device. Examples of extraction features used in the improved front lit display device described herein are shown in FIGS. 4B, 6A-6C, and 8A-15C.

Electronic devices may be used to consume digital content. Some electronic devices may be configured to display or present digital content on a display device, such as a front lit display device. A variety of devices, such as electronic book or e-reader devices, desktop computers, portable computers, smartphones, tablet computers, televisions, wearable devices, and so forth may be used to access various forms of content and other information. Display devices may be used to present content in one or more colors. In some instances, light emitting diodes (LEDs) of various colors may be used to render and/or present digital content on a display device. For example, an LED array with one or more LEDs may be used to emit light that propagates through a display stack causing an image or other content to be presented at the display device. Display stacks may include components such as, in one example, light guides, touch layers, capacitive sensors, cover layers or protective layers, and/or other components including a pixelated LCD display panel which modulates light to produce the image. The display stacks may be used as part of an electronic device to present content in one or more colors.

Liquid crystal displays ("LCDs") use liquid crystals to generate images. Liquid crystal displays may be configured to operate in reflective, transmissive, or transflective modes. In a reflective LCD, a reflector is disposed behind the LCD and configured to reflect ambient light back through the LCD generally towards the user.

Electrophoretic displays (EPDs) generally form images by rearranging charged pigment particles with an applied electric field.

In accordance with one or more implementations, aspects and features disclosed herein are used for an E-reader device utilizing an EPD that includes a color adjustable front light (CAFL) which operates by driving both amber and white LEDs to tune a color point from cool to warm.

In one or more embodiments, a device such as an e-book reader device, a wearable device, and a signage device, among other devices, may display content, such as text and/or images of a book, by reflecting light emitted by one or more light sources using a reflective display. For example, some devices may have light guides positioned proximate to a front end of a device (e.g., the end from which a viewer sees content presented by the device), and reflective displays behind the light guides (e.g., toward a back end of the device). The device may use one or more light guides to propagate light from one end of the device to another, with extraction features positioned in the light guides for extracting (e.g., refracting and/or reflecting) light from the light guides. The extracted light may impinge on a reflective surface of the reflective display (e.g., a reflector disposed behind a LCD) positioned behind the one or more light guides, and the reflective display may reflect the extracted light. A viewer may see the light reflected by the reflective display.

FIG. 1 illustrates a system 100 for presenting content using a device 102, in accordance with one or more example embodiments of the present disclosure. For clarity of illustration, the figures in this disclosure are not depicted to scale. For ease of description, three axes orthogonal to one another are shown, designated as X, Y, and Z. For ease of discussion, and not by way of limitation, in this disclosure, "front" indicates a side which may be proximate to a user during typical use of the device 102, while "back" indicates a side opposite the front which is distal to the user during typical use, along the Z axis depicted here.

Referring to FIG. 1, the system 100 may include the device 102 (e.g., a display device), which may display content 104 (e.g., text, images, video, etc.) on a display panel 106 (e.g., an LCD panel) using a light guide 108 and one or more light sources (e.g., LEDs such as light source 110, light source 120, light source 122, light source 124), which may be positioned in one or more light chambers 111. The device 102 may include a first end 112 (e.g., a top end), a second end 114 (e.g., a bottom end), a first side 116 (e.g., a left side), and a second side 118 (e.g., a right side). Alternatively, the second end 114 may be the top end, and the first end 112 may be the bottom end. The device 102 may also include a front end 130 and a back end 132, where the front end 130 is located more proximate to a user of the device 102 than the back end 132 when the user is viewing the content being presented via the device 102.

The display panel 106 may be a reflective LCD panel or EPD panel and may include one or more of electrodes, liquid crystal material, polarizers, or color filters. Although reference is often made herein to an LCD display, the display of the device 102 may also be an electrophoretic (EPD), and particularly an EPD display including a color adjustable front light, or any other type of display, and aspects and features disclosed herein are disclosed for use with such an EPD or any other type of display. A reflector may be optically coupled to the display panel 106, or integrated therein. The reflector may reflect incident light. The incident light may include ambient light, emitted light from the one or more light sources of the device 102, or both. In some implementations the reflector may include a mirror, film, paint, coating, and so forth. For example, aluminum may be deposited on the back side of a second polarizer in the display panel 106 to form the reflector. Other materials may also be used to form the reflector including, but not limited to, silver or gold. The thickness of the deposited layer may be at least 800 nanometers or another thickness. In some implementations, the mirror may include one or more dielectric materials to form a dielectric mirror.

The reflector may be directive in that incident light is directed along particular paths. Some of the components in the display panel 106 may be optically disruptive. That is, these components may block or distort light in ways which are undesirable from a standpoint of overall reflectivity of the display panel 106. For example, the electrodes within an LCD that control the liquid crystal material may result in areas of decreased transmittance. The directive reflector may direct incident light to avoid at least a portion of a plurality of the display components which may be optically disruptive.

Arranged in front of the display panel 106 is a light guide 108. The light guide 108 may be laminated to the display panel 106. The light guide 108 may be substantially planar and may comprise one or more materials such as plastic, glass, aerogel, metal, ceramic, and so forth. The light guide 108 may be configured with one or more features on the surface thereof, integral with, or embedded within, which are configured to direct light along pre-determined paths. These features may be refractive, diffractive, reflective, and so forth. In one implementation, the features may comprise a plurality of surface relief structures. These structures may be on the order of about 10 microns or less in one lateral dimension.

The light guide 108 may distribute at least a portion of light emitted by the light source 110 to the display panel 106. The one or more light sources are shown here in a cutaway view of the device 102. The one or more light sources may emit light when activated. The light emitted may comprise photons in infrared wavelengths, visible wavelengths, ultraviolet wavelengths, or a combination thereof. The one or more light sources may include one or more LEDs, cold cathode fluorescent lamp ("CCFL"), electroluminescent materials, sonoluminescent materials, fluorescent lights, incandescent lights, or a combination thereof. In some implementations, different types of the one or more light sources may be used in the same device 102. For example, electroluminescent lights may be used in conjunction with LEDs. LEDs may include a combination of white and amber LEDs to adjust the "warmth" of the light that is viewed by the user (for example, the use of these different types of LEDs may allow for the screen to adjust along a gradient of colors including a "warmer" amber color and a "cooler" white color). The one or more light sources may be arranged along one or more sides or ends (e.g., along the X-axis proximate the first end 112 or proximate the second end 114). The one or more light sources may be adjacent to and may be optically coupled to the light guide 108 such that light emitted from the one or more light sources may be distributed to at least a portion of the display panel 106 using the light guide 108.

The optical coupling between the light guide 108 and the one or more light sources 110 may include one or more of physical proximity, an air gap, an adhesive, a mechanical interface, and so forth. In some implementations, one or more surface features may be provided on the light guide 108, the one or more light sources, or both. These surface features (e.g., extraction features as explained further below), such as diffusers, grooves, grating, dimples, lenses, planar surfaces, concave surfaces, convex surfaces, and so forth, may be used to enhance or attenuate the transmission or dispersion of light between the one or more light sources and the light guide 108. In some implementations, these surface features may be separate or discrete elements which have been coupled to the light guide 108. For example, a microlens array may be adhered to the light guide 108 to aid the optical coupling with the light source 110.

In one or more embodiments, the device 102 be driven by a personal computer (PC), a smart home device, a device with one or more speakers or other audio outputs, a wearable wireless device (e.g., bracelet, watch, glasses, ring, etc.), a desktop computer, a mobile computer, a laptop computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Reflective LCD has gradually improved as a display technology for e-book reader devices. LCD may be treated either as a low-cost alternative to an EPD or may be used as an alternative e-reader product offering colors without compromise to the reading comfort. One of the challenges associated with reflective LCDs is that reflective LCDs tend to have lower reflection than EPD panels. Another challenge is that, due to the panel structure, the raw image of the panel appears more metallic than paper-like, which may be undesirable in some cases. To create a display experience similar to that of an e-reader in a reflective LCD, a front light needs to be incorporated with the LCD panel. The front light may need to be configured be such that the front light can boost the brightness of the image up to the point that the user experiences a white screen instead of some shade of grey. The brightness boost must also occur without compromising the display contrast ratio (CR) of the screen. Additionally, the front light must provide a reasonably broad viewing angle so that the panel appears less metallic and more paper-like to the reader.

The challenges associated with producing an effective front light for a reflective LCD result from the optical properties of the panel. The reflection from the panel has a strong dependence on the light incident angle. Accordingly, the light may need to be injected to the screen in a much more controlled beam in a reflective LCD than in an EPD panel.

FIGS. 2A-2F illustrate the way light interacts with EPD panels and reflective LCDs. The incident angle, $\theta i$, and display scattering function determine how bright the panel appears to a user viewing the device. In typical reading condition, only light rays "B" that leave the panel close to the display normal (shown as the black dashed line) contribute to the display brightness. An EPD scatters the incident light greatly which makes the display both paper like and ideal for front light application. Reflective LCD exhibits more mirror-like properties with a small scattering function. Viewing is possible in various angles, however, the panel has an optimal operational spot, making the reflective LCD less paper-like than an EPD.

Figure 2D:
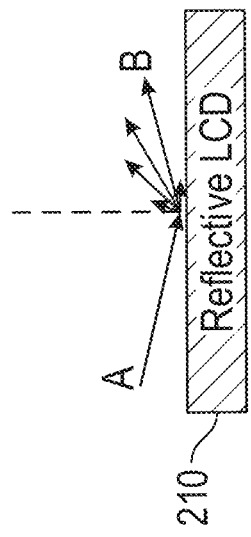
FIGS. 2A-2F illustrate the reflective properties of e-ink displays (EPD) and reflective LCD displays, in accordance with one or more example embodiments of the present disclosure.
Figure 2E:
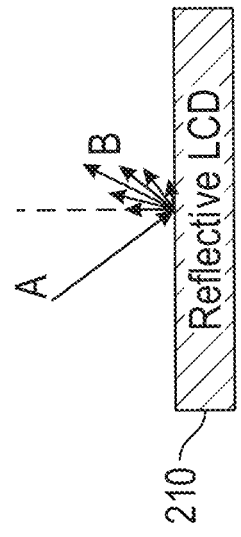
Figure 2F:
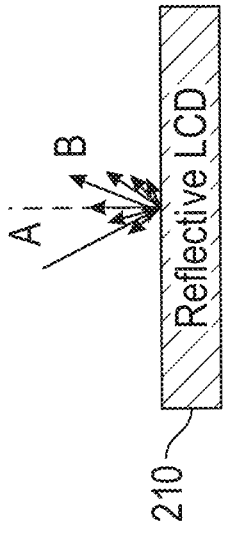
Figure 2A:
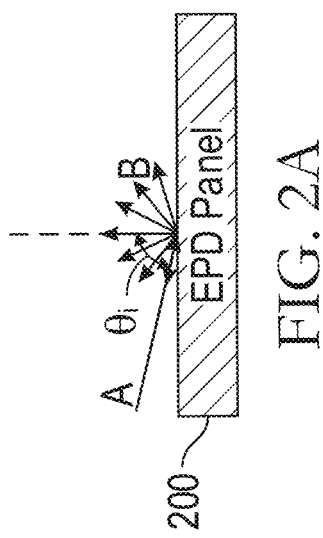
Figure 2B:
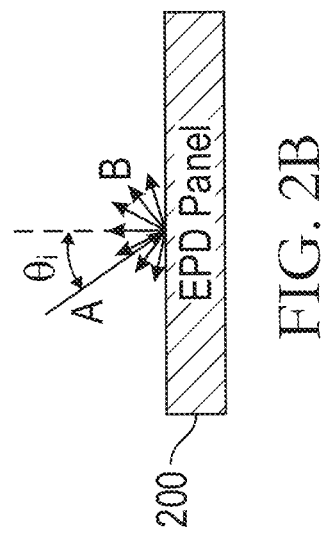
Figure 2C:
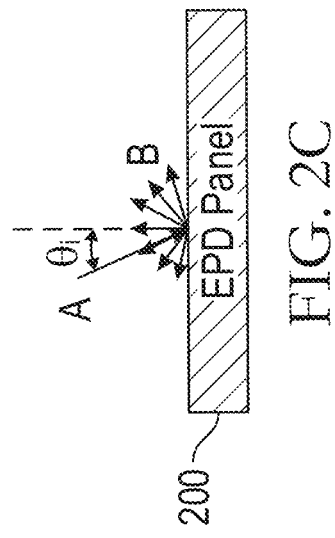

FIGS. 2A-2C show that the EPD panel 200 exhibits almost fully Lambertian reflection properties. That is, the EPD panel 200 reacts to light in a very similar way to a sheet of a non-glossy paper. Regardless of the light incident angle of the light provided to the EPD panel 200, the light reflects from the EPD panel 200 in almost the same manner. For example, FIG. 2A shows the light being provided at an incident angle $\theta i=78°$, FIG. 2B shows the light being provided at the incident angle $\theta i=30°$, and FIG. 2C shows the light being provided at an incident angle $\theta i=20°$. This provides great freedom in the design of the front light of the device.

FIGS. 2D-2F, in contrast, show that the way light reflects from the reflective LCD 210 is highly dependent on the angle of incidence of the light that is provided to the reflective LCD 210. The reflective LCD 210 instead requires that the incidence angle of the injected light is close to the display normal for the reflected light to exhibit similar properties as the reflected light from the EPD panel 200. Otherwise, the reflective LCD 210 may absorb the injected light or redirect the light to angles that are not optimal for a user of the device (shown most prominently in FIG. 2D).

Unlike a back light film, the front light film sits on top of the display of the device and the user views the content presented via the panel through the light source. Consequentially, there may be requirements for devices that use front lights that may not necessarily apply to devices that use back lights. One of such challenges is that the light guide should leak as little light as possible upwards towards the display normal (shown as the black dashed line in FIGS. 2A-2F). Such stray light does not contribute to panel illumination and has the potential to significantly reduce the display CR. This is compounded by the fact that the typical reflection of a reflective LCD may be less than half of that of an EPD panel. Thus, the stray light contributes to a bigger portion of the display brightness.

Figure 3:
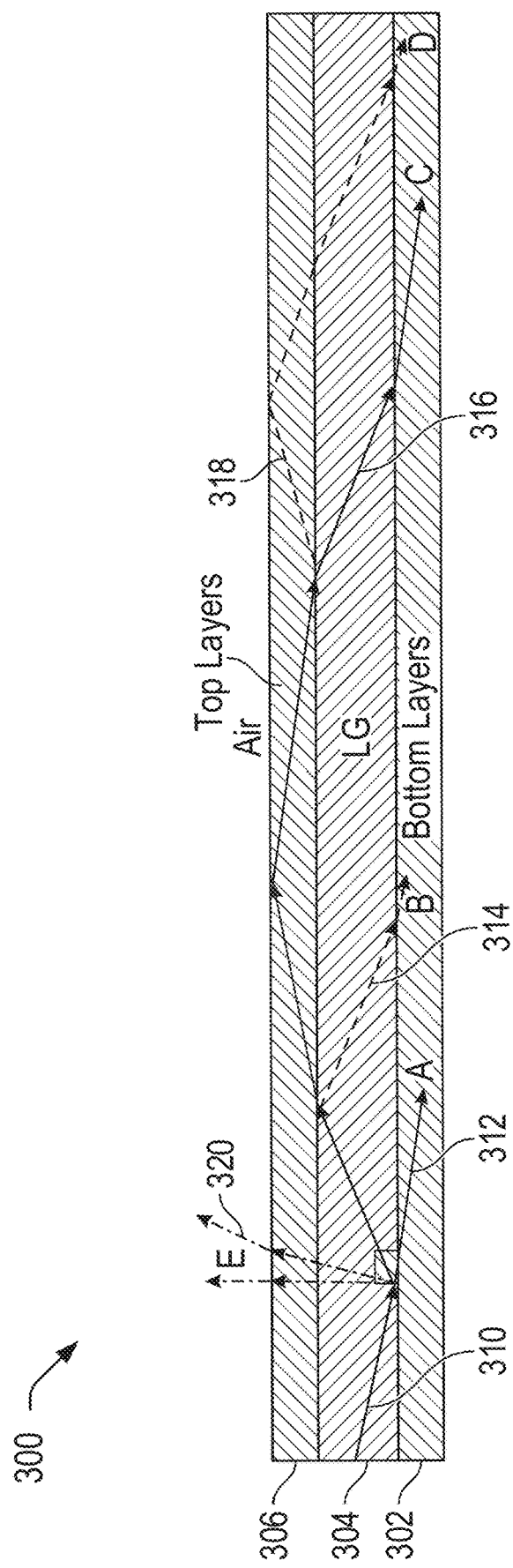
FIG. 3 illustrates various light paths through a light guide, in accordance with one or more example embodiments of the present disclosure.
Figure 7A:
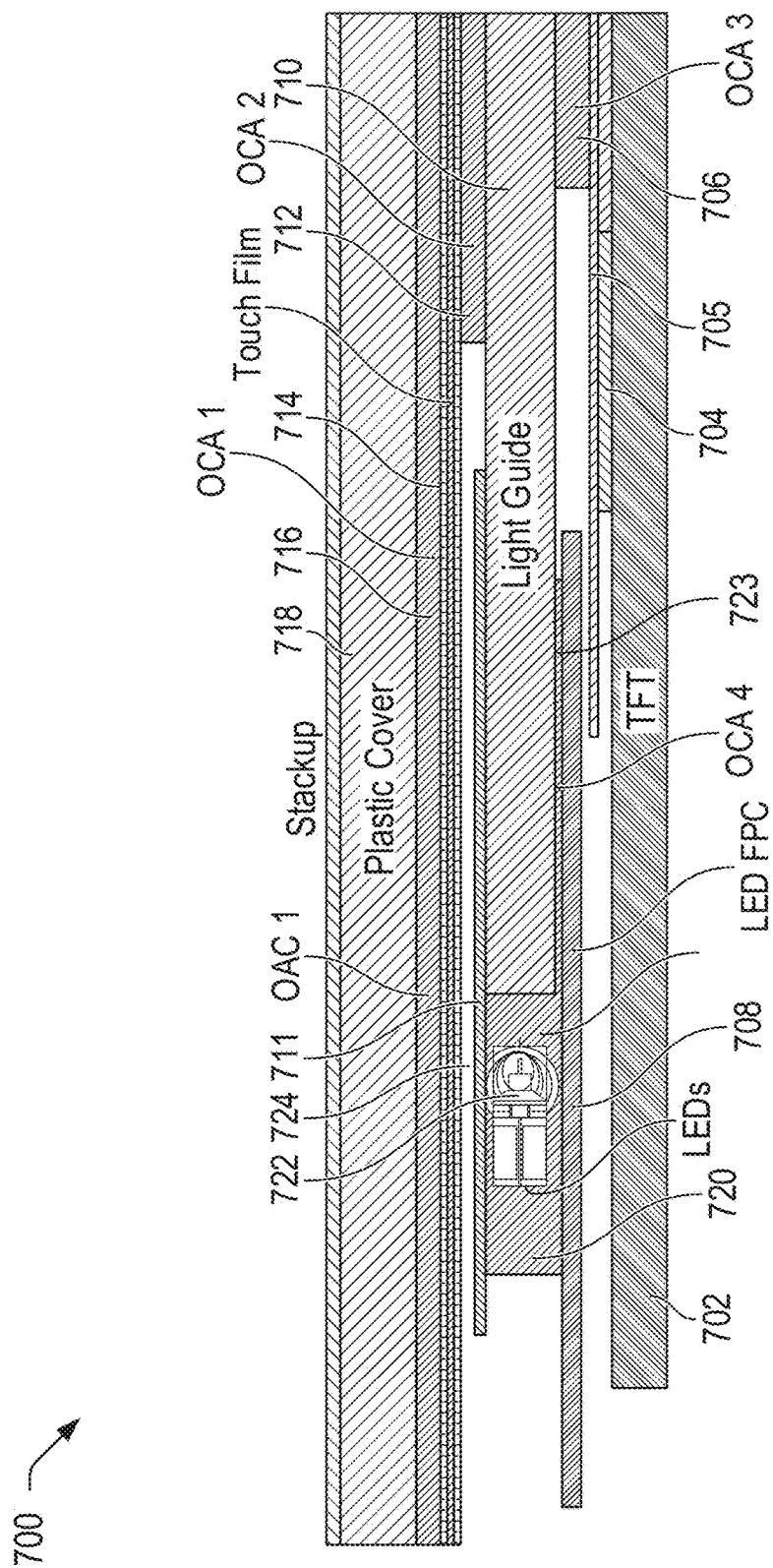
FIGS. 7A-7B illustrate further cross-sectional views of a display stack of the device of FIG. 1, in accordance with one or more example embodiments of the present disclosure.
Figure 7B:
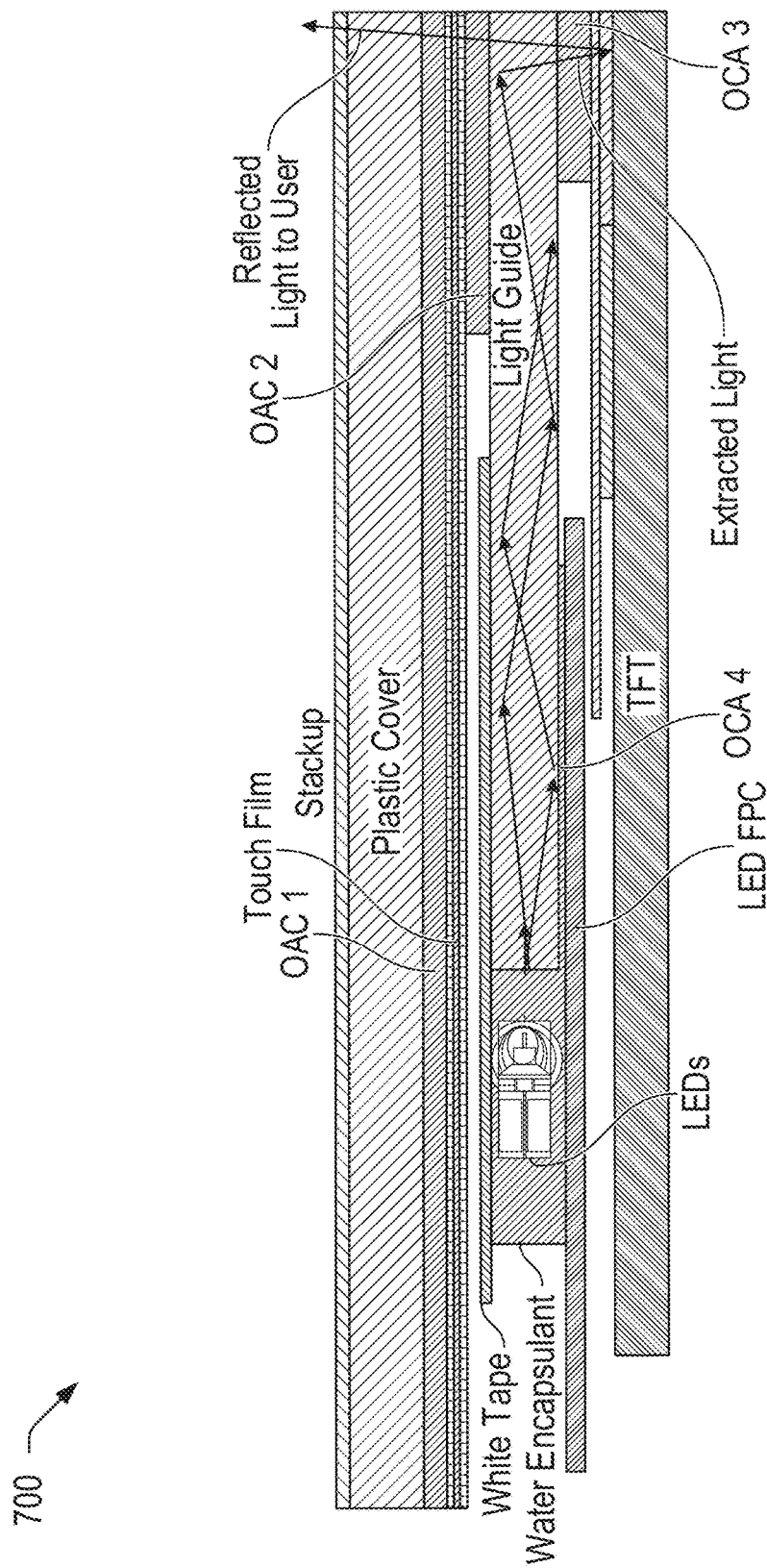

FIG. 3 shows a simplified display stack 300 illustrating this concept. The simplified display stack 300 includes one or more bottom layers 302, a light guide 304, and one or more top layers 306 (a more detailed display stack is shown in FIGS. 7A-7B). As shown in FIG. 3, injected light 310 (for example, light produced by LEDs included in the device) can take several different extraction paths to the display (for example, path 312, path 314, path 316, path 318, and path 320). Path 320 is the most detrimental light fpath that directly results in display CR reduction. If, however, the optical pattern is buried in the optically clear adhesive of the display stack, the amount of light that follows the path 320 is drastically reduced. In this case, other factors such as the unintended scattering of light along paths 312-318 in display layers may eventually contribute more significantly to setting the CR of the display.

To preserve an optimal CR in traditional EPD front lights, a light extraction pattern is laminated against an optically clear adhesive film. This drastically reduces the optical power of the front light extraction pattern compared to a configuration where an optical pattern is provided against air. It is possible to design the stack such that the light extracts through the bottom side of the film without much light reflecting upwards towards the display normal. The illuminated film appears transparent while simultaneously delivering light towards the screen.

The front light of a conventional e-reader device uses a binary grating or cylindrical-shaped dot patterns (an example of which is shown in FIGS. 8A-8B). These types of extraction features include extraction angles that are relatively large (for example, $\theta i=78°$ relative to the normal of the display). However, when a light guide including these types of conventional extraction features is laminated on a reflective LCD, the reflective LCD panel may either absorb the front light or redirect the light to angles that are not optimal for a user of the device (as shown in FIGS. 2D-2F). Thus, when a reflective LCD panel is used in a device, the light may need to be injected to the screen closer to the display normal (for example, $\theta i<20°$) as shown in FIG. 4A. This requirement, however, conflicts with the desire to maintain a high CR for the display because the lamination may limit the possible extraction angles away from the display normal.

Figure 4B:
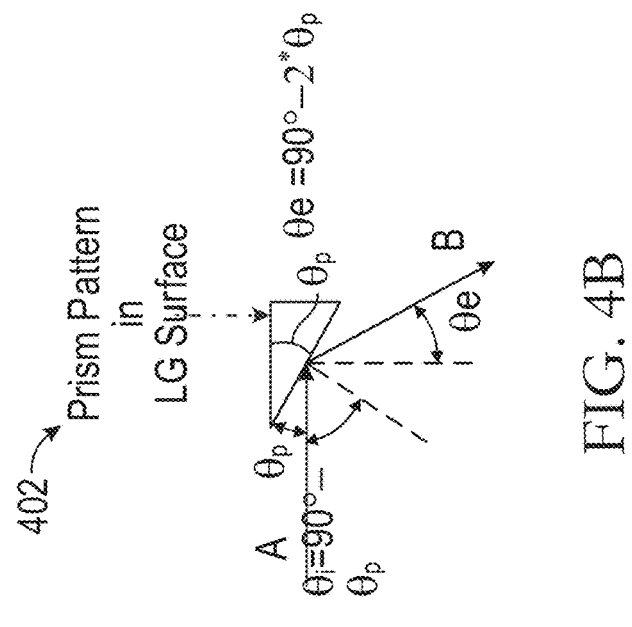
FIGS. 4A-4B illustrate the use of an extraction feature, in accordance with one or more example embodiments of the present disclosure.
Figure 4A:
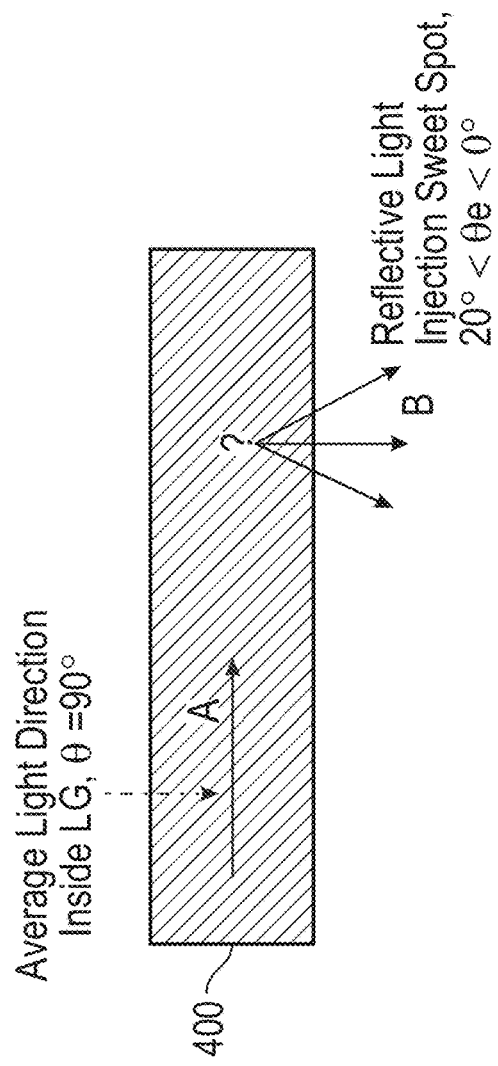

To inject the light within a given angle form the display normal, a prism-shaped extraction feature 402 as shown in FIG. 4B may instead be used to direct the light emitted from the LEDs towards the display. Various examples of configurations for this prism-shaped extraction feature 402 are shown in FIGS. 9A-15C.

FIG. 4B shows a simplified relation between the light extraction angle, $\theta e$, and a prism pattern wall angle, $\theta p$. To direct the light ray "A" in a single interface interaction to a desired extraction cone, the prism angle may be designed at $45°<\theta p<35°$. This means that the incident light ray may hit the pattern face between $45°<\theta i<55°$, for example. Here, the refractive index (RI) of the light guide material and the surrounding material (for example, optically clear adhesive and/or air) becomes important. The light may only total internal reflect (TIR) in the prism elements if the angle in which the light hits the interface is greater than the critical angle, i.e., $\theta > \theta c$. For the materials to support the chosen prism angle, the optically clear adhesive material RI may need to be low (for example, less than 1.12). These angles and other values are not intended to be limiting.

Figure 5:
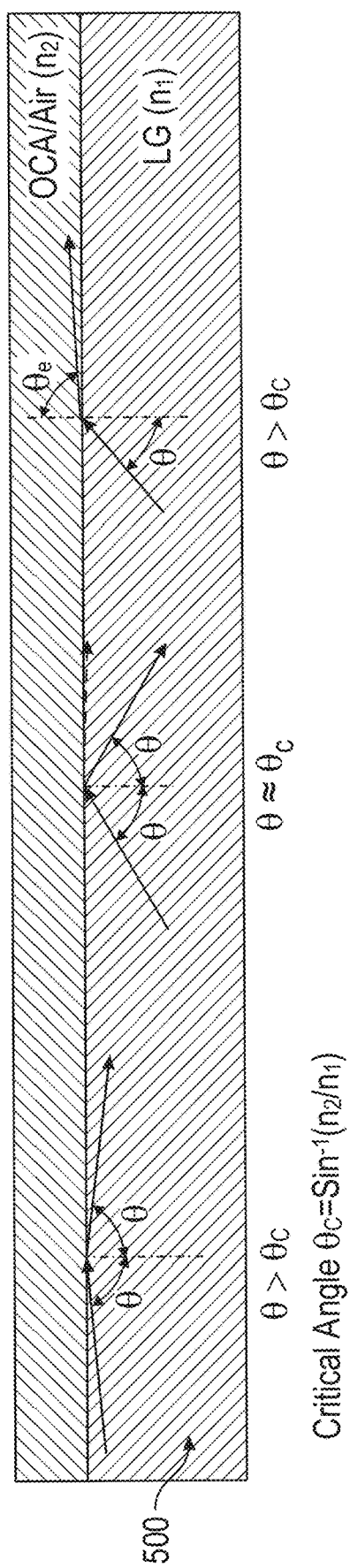
FIG. 5 illustrates a critical angle based on a refractive index of a light guide, in accordance with one or more example embodiments of the present disclosure.

FIG. 5 illustrates that the refractive index of a light guide 500 and surrounding material (for example, optically clear adhesive, air, etc.) determines the critical angle. If the light inside the light guide 500 hits a pattern or a flat film surface of the light guide 500 with an angle $\theta > \theta c$ relative to the interface normal, it may totally internally reflect from the surface. If $\theta < \theta c$, the ray refracts through the interface and exists the light guide 500.

Figure 6A:
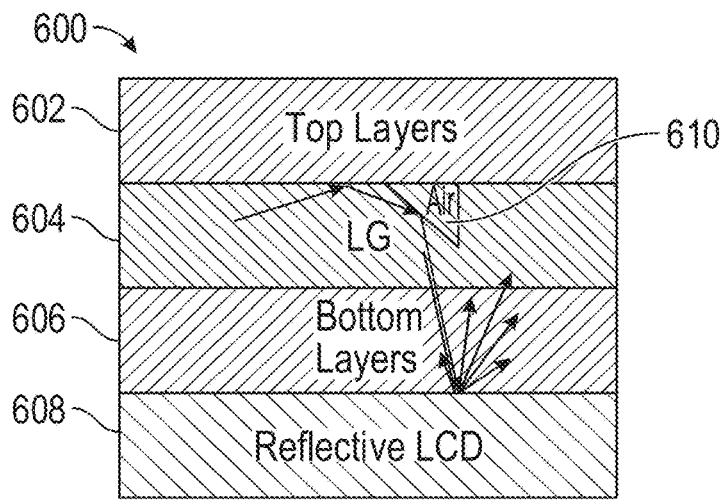
FIGS. 6A-6C illustrate cross-sectional views of various implementations of the device of FIG. 1, in accordance with one or more example embodiments of the present disclosure.
Figure 6B:
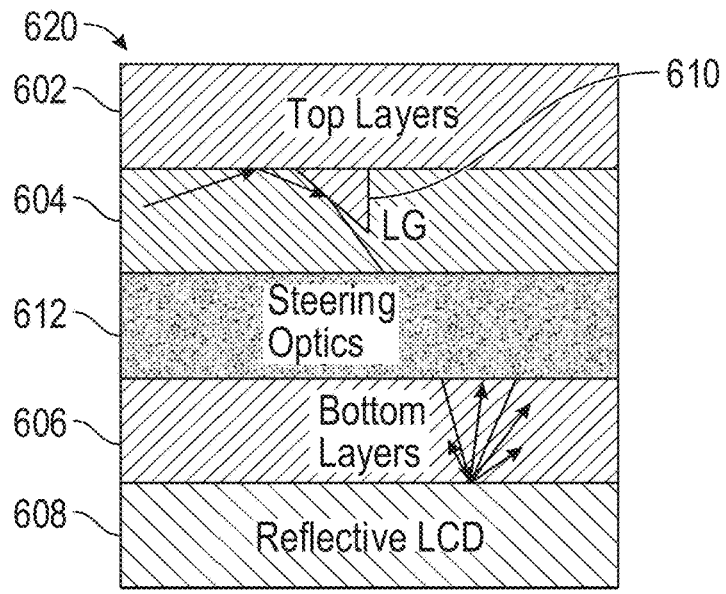
Figure 6C:
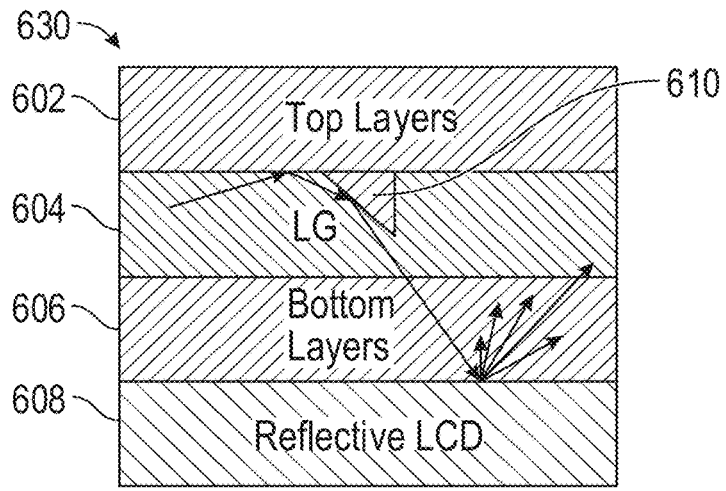

FIGS. 6A-6C illustrate examples of various display stack configurations including the prism-shaped extraction feature associated with the improved display device as described herein. It should be noted that although the display stacks of FIGS. 6A-6C only show a single extraction feature, this is only a simplification, and a typical device may include a number of such extraction features provided along a light guide. While reference is made to a reflective LCD (for example, reflective LCD 608, it should be noted that any other type of display may also be used (EPD, etc.).

FIG. 6A shows a first example of a display stack 600 in which the extraction feature 610 is provided as an air pocket within the light guide 604. In this configuration, light from a light source (such as one or more LEDs or any other type of light source) may be directly reflected to the directed location at the reflective LCD 608 via a single layer film at an incidence angle close to the normal of the display. The optical power of the pattern may be significantly higher than that of a laminated film. Using prismatic shapes, the front light may be freely designed to extract to any angle, for instance, to the desired location on the reflective LCD 608. Additional diffuser film on top or below the light guide 604 may also be provided to improve the performance.

FIG. 6B shows a second example of a display stack 620 in which multiple active layers or materials are included within the light path from the light guide 604 to the display 608. In this configuration, the light gradually tilts or steers towards the target angle via steering optics 612. In this configuration, two or more material interface interactions are required to for the light to reach the desired location of the reflective LCD 608.

FIG. 6C shows a third example of a display stack 630. The configuration shown in FIG. 6C is similar to the configuration shown in FIG. 6A, however, the extraction feature 610 may be made from a material of a low refractive index, rather than being an air pocket. Particularly, the extraction feature 610 may be made from a material of a lower refractive index than the material form which the light guide 604 is made. By providing the extraction feature at a lower refractive index, the light can refract from the extraction feature 610, through the light guide 604, and towards the reflective LCD 608 at a desired angle (for example, close to the normal of the display. Using the prism shape for the extraction feature 610 allows to change the extraction angle more than if "binary" or cylindrical-shaped features (shown in FIG. 8A) are used. While reference is made to extraction features that refract light (or refractive features), the extraction features may also reflect light as well, in some embodiments. Thus, any reference to refraction of light may similarly be replaced by reflection of light.

FIG. 7A-7B illustrate further cross-sectional views of a display stack 700 of the device 100 of FIG. 1. The display stack 700 shown in FIGS. 7A-7B is more detailed than the display stacks 600, 620, and 630 of FIGS. 6A-6C and provides further examples of elements that may be included in a display stack. However, even the display stack 700 is not intended to be limiting and any other layers may also be included in the display stack 700. Additionally, the layers shown in the display stack 700 may also be provided in any other order and in any other shapes and/or sizes.

Beginning at the bottom of the display stack 700, a thin film transistor layer 702 is shown. The thin film transistor layer 702 includes the electrical components (for example, one or more transistors) that switch the e-paper inks included in the e-reader device. Provided on top of the thin film transistor layer 702 is a layer 704 of capsules that are filled with black ink. The ink is electrostatically charged such that when the transistors in the thin film transistor layer 702 turn on, the ink changes from black to white. Provided on top of the layer 704 is a protective layer 706, followed by a first laminate 705 that is used to adhere the e-ink display to the light guide 710. The protective layer 706 may be an acrylic or Silicone material, for example (or any other type of material). Additionally, multiple protective layers may be provided as well.

The light guide 710 receives light produced by the LEDs 722 and guides the light down the length of the display (as shown in FIG. 7B). This light is extracted in a controlled fashion using extraction features as described herein to produce uniform illumination of the display. In embodiments, the extraction features may be provided at a top portion 711 of the light guide 710. Examples of extraction features that may be provided in the display stack to achieve optimal brightness of the display, while simultaneously minting sufficient CR and other properties of the display are shown in FIGS. 9A-15C. Particularly, these extraction features may be "prism" or "wedge" shaped features that include a "wedge angle" within a range of angles such that the light is guided into the reflective LCD at a desired angle.

Additionally, the shape and/or sizes of the extraction features that are provided along the light guide 710 may not necessarily be the same. In some instances, it may be desirable for the "wedge angle" of a set of extraction features provided at one location along the light guide 710 to be larger than the wedge angle of another set of extraction features provided at another location along the light guide 710. For example, extraction features with larger wedge angles may be provided closer to the one or more LEDs 722 emitting the light that travels through the display stack 700 (as shown in FIG. 7B). The extraction features provided further from the LEDs 722 may be provided with a wedge angle between 26-to-31-degrees (or any other angle). As used herein reference to a range "between" two values may also be inclusive of the two values (for example, between 26 and 31 degrees may also include 26 degrees and 31 degrees).

A second laminate layer 712 is provided to adhere the light guide 710 to a touch film 714. The touch film 714 may include a single layer or may include multiple layers adhered together, as shown in FIGS. 7A-7B. A third laminate layer 716 adheres the touch film 714 to a plastic cover 718. The plastic cover 718 may be a two-layer cover, as shown in FIGS. 7A-7B, however, the plastic cover 718 may also include any other number of layers (or a single layer).

The display stack 700 also includes one or more LEDs 722 that may produce the light used to illuminate the display of the device 100. For example, the LEDs 722 may include a combination of white and amber LEDs to adjust the "warmth" of the light that is viewed by the user (for example, the use of these different types of LEDs may allow for the screen to adjust along a gradient of colors including a "warmer" amber color and a "cooler" white color). The one or more LEDs 722 may be provided in a flexible printed circuit board, for example. The one or more LEDs 722 may also be adhered to the light guide 710 using a fourth laminate layer 723. An encapsulate 720 may be provided around the one or more LEDs 722 to provide waterproofing for the one or more LEDs 722. The encapsulate 720 may also serve to spread the light produced by the one or more LEDs 722. The encapsulate 720 may be a UV-cured acrylic or any other type of material. A white tape 724 may also be provided as a layer over the one or more LEDs 722 to help recycle light in the light guide 710 and control some color gradient from color coming out of the one or more LEDs 722 at high angle. Another layer of white tape may also be provided between the one or more LEDs 722 and the fourth laminate layer 725 to help guide the direction of travel of the light.

FIGS. 8A-15C illustrate various types of extraction features that may be provided within a light guide of the device 100 as described herein. Particularly, FIGS. 8A-8D illustrate conventional extraction features 800 and 810 and FIGS. 9A-15C illustrate improved extraction features as described herein.

Figure 8D:
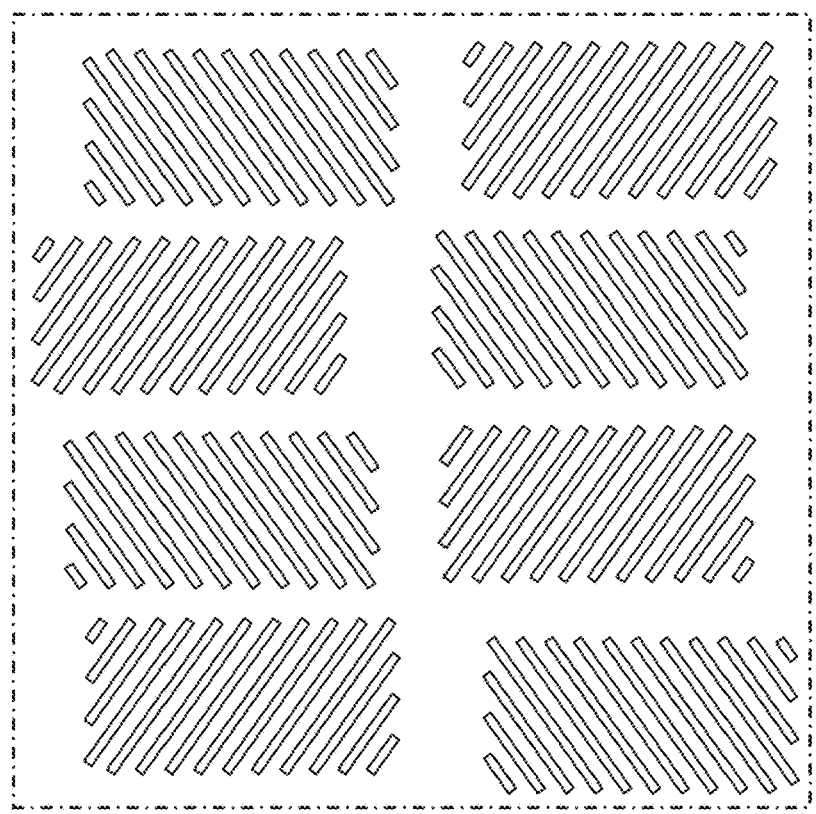
FIG. 8D illustrates a top-down view of the extraction feature of FIG. 8C, in accordance with one or more example embodiments of the present disclosure.
Figure 8C:
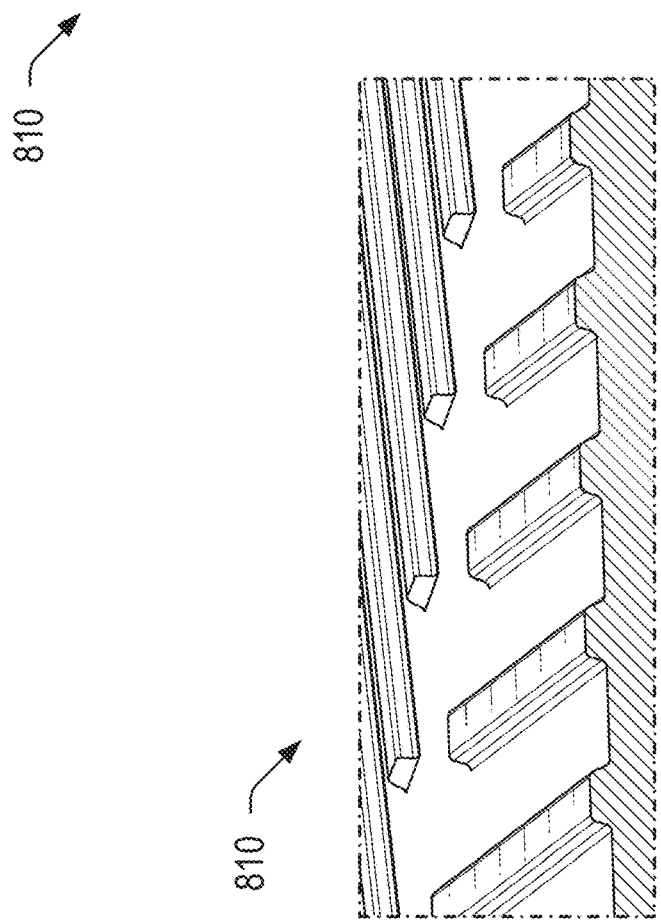
FIG. 8C illustrates a perspective view of another extraction feature of a light guide, in accordance with one or more example embodiments of the present disclosure.

As shown in FIGS. 8A-8B, the conventional extraction features 800 are cylindrical-shaped "dot" patterns. FIG. 8A shows a bottom-up view of the extraction feature 800 and FIG. 8B shows a cross-section of a side view of the extraction feature 800. Accordingly, the sidewall angle 802 (also shown as θ) of the extraction feature 800 is relatively small (within a range from 5 and 15 degrees, for example). The height may be between 1.5 and 1.8 μm. The radius of curvature may be less than 0.2 μm. The base width of the cylindrical dot (ACD) may be between 4.5 and 5.5 μm. These conventional extraction features may also be refractive elements such that light refracts from the extraction features 800 in the light guide. FIGS. 8C-8D show another example of conventional extraction features 810 in the form of "binary grating" patterns. In some embodiments, the extraction features of FIGS. 8A-8D may extract light using refraction (which may be based on the shape and position of the extraction features). Additionally, in some embodiments, the extraction features of FIGS. 8A-8D may be placed at the bottom of a light guide. However, the extraction features may also be placed at any other location.

FIGS. 9A-15C show improved extraction features as described herein. The extraction features shown in FIGS. 9A-15C may be a "wedge" shape that helps to mix extracted light in the plane of the display. If the angle is only in one plane then unusual texture-like looks to the light that is redirected onto the display may result. In some embodiments, a front edge (for example, the edge associated with the faces of the extraction features with which the light first interacts) of the extraction future may be curved In some embodiments, the sides of the extraction features may also generally be curved, resulting in a "swept" shape of the extraction features. The texture is caused by preferred directions of the extracted light aligned with the rotation and angular spread of the extractors. The curved shape helps to expand the range of direction of extracted light and homogenize the textures away. In some embodiments, the extraction features of FIGS. 9A-15C may extract light using reflection (however, any of the extraction features described herein may extract light using refraction or reflection).

Turning to FIGS. 9A-9B, extraction feature 900 is shown. FIG. 9A shows a bottom-up view of the extraction feature 900 and FIG. 9B shows a cross-section of a side view of the extraction feature 900. In contrast with the conventional extraction feature 800 shown in FIGS. 8A-8B, the extraction feature 900 shown in FIGS. 9A-9B is a "wedge" shape. That is, the surface 902 with which the light emitted by the LEDs initially interacts is provided at a wedge angle 906 with respect to a top surface 904 of the extraction feature 900 that is smaller than the extraction feature 800. In embodiments, the first angle 906 is between 26 and 31 degrees. Providing the extraction feature in this wedge shape with the wedge angle 906 between this range of angle values is important such that the light refracted from the extraction feature 900 (or reflected from the extraction feature 900) interacts with the reflective display at an angle that is close to a normal of the reflective display (for example, an angle that is less than or equal to 20 degrees or any other angle). However, while reference is made to a range of 26 to 31 degrees, it should be noted that any other angle may also be used.

In one or more embodiments, the extraction feature 900 may also be characterized by a side angle 908 of 83 degrees, a height 910 of 4.0 µm, a first width 912 of 15 µm, a length 914 of 8.7 µm, a second width 916 of 6.86 µm, and a radius of rotation 918 of 15 µm.

Figure 10B:
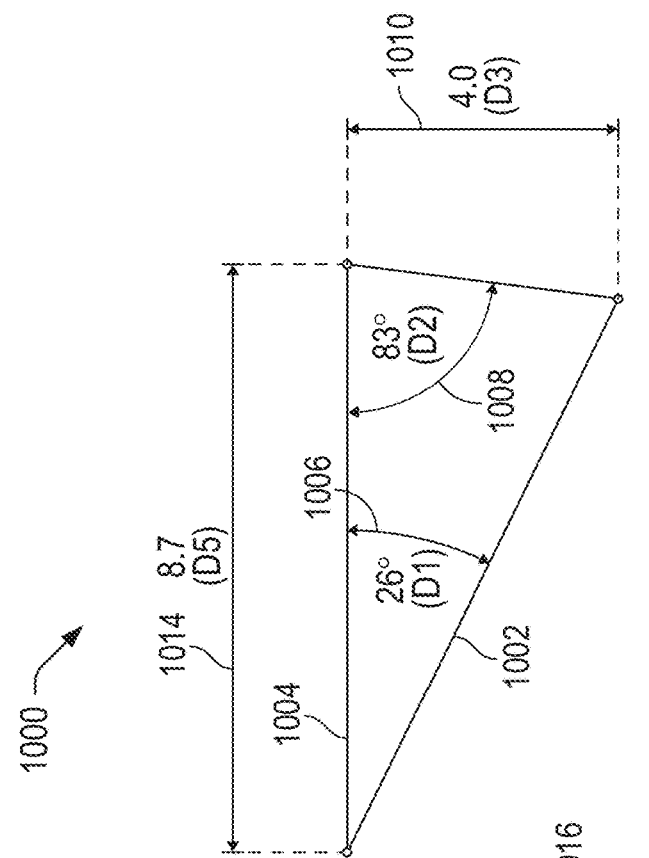
FIG. 10B illustrates a cross-section view of the extraction feature of FIG. 10A, in accordance with one or more example embodiments of the present disclosure.
Figure 10A:
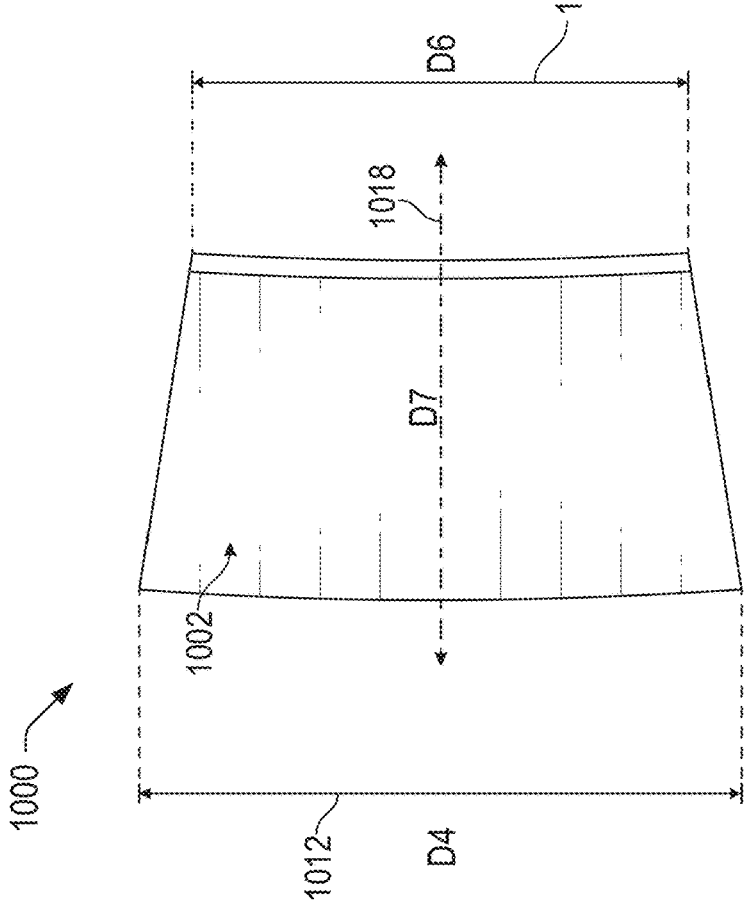
FIG. 10A illustrates a bottom-up view of another extraction feature of a light guide of the device of FIG. 1, in accordance with one or more example embodiments of the present disclosure.

FIGS. 10A-10B show another example of an extraction feature 1000. FIG. 10A shows a bottom-up view of the extraction feature 1000 and FIG. 10B shows a cross-section of a side view of the extraction feature 1000. Similar to the extraction feature 900, the extraction feature 1000 may include a wedge angle 1006 between 26 and 31 degrees. In one or more embodiments, the extraction feature also may also be characterized by a side angle 1008 of 83 degrees, a height 1010 of 4.0 µm, a first width 1012 of 15 µm, a length 1014 of 8.7 µm, a second width 1016 of 12.55 µm, and a radius of rotation 1018 of 50 µm.

FIGS. 11A-11B show another example of an extraction feature 1100. FIG. 11A shows a bottom-up view of the extraction feature 1100 and FIG. 11B shows a cross-section of a side view of the extraction feature 1100. Similar to the extraction feature 900, the extraction feature 1100 may include a wedge angle 1106 between 26 and 31 degrees. In one or more embodiments, the extraction feature also may also be characterized by a side angle 1108 of 83 degrees, a height 1110 of 4.0 µm, a first width 1112 of 22 µm, a length 1114 of 8.7 µm, a second width 1116 of 7.2 µm, and a radius of rotation 1118 of 11 µm.

FIGS. 12A-12B show another example of an extraction feature 1200. FIG. 12A shows a bottom-up view of the extraction feature 1200 and FIG. 12B shows a cross-section of a side view of the extraction feature 1200. Similar to the extraction feature 900, the extraction feature 1200 may include a wedge angle 1206 between 26 and 31 degrees. In one or more embodiments, the extraction feature also may also be characterized by a side angle 1208 of 83 degrees, a height 1210 of 4.0 µm, a first width 1212 of 15 µm, a length 1214 of 8.7 µm, a second width 1216 of 11.29 µm, and a radius of rotation 1218 of 33 µm.

Figure 13B:
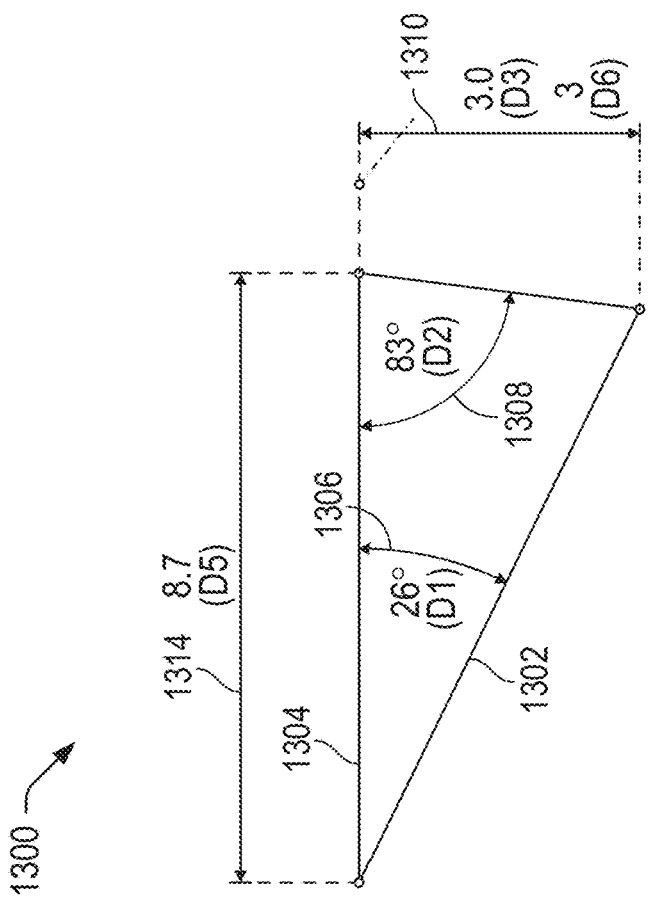
FIG. 13B illustrates a cross-section view of the extraction feature of FIG. 13A, in accordance with one or more example embodiments of the present disclosure.
Figure 13A:
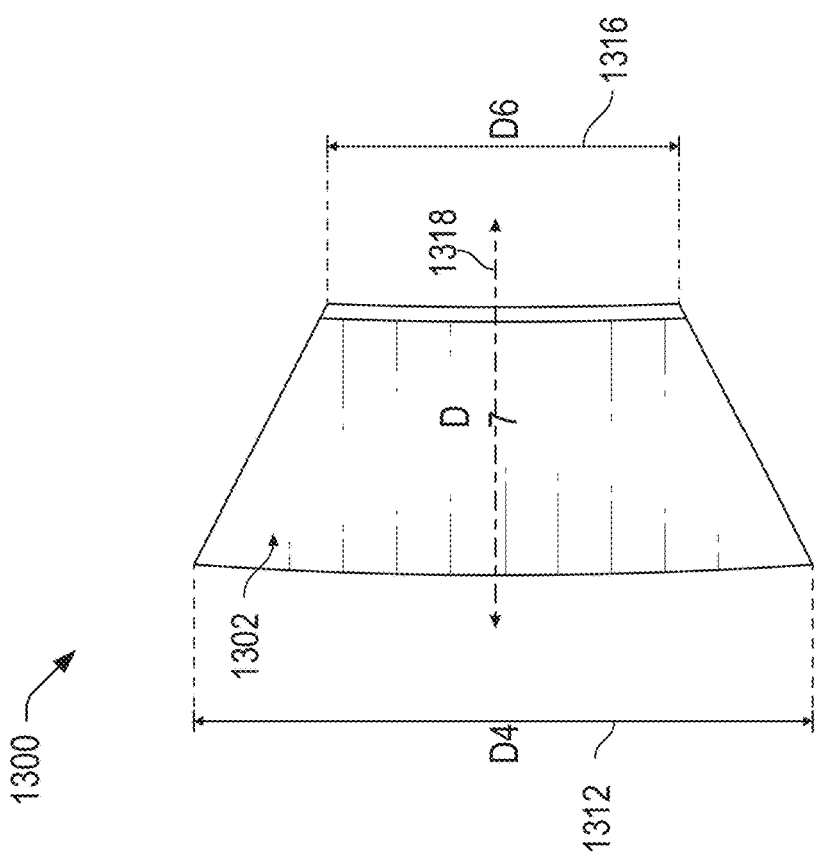
FIG. 13A illustrates a bottom-up view of another extraction feature of a light guide of the device of FIG. 1, in accordance with one or more example embodiments of the present disclosure.

FIGS. 13A-13B show another example of an extraction feature 1300. FIG. 13A shows a bottom-up view of the extraction feature 1300 and FIG. 13B shows a cross-section of a side view of the extraction feature 1300. Similar to the extraction feature 900, the extraction feature 1300 may include a wedge angle 1306 between 26 and 31 degrees. In one or more embodiments, the extraction feature also may also be characterized by a side angle 1308 of 83 degrees, a height 1310 of 3.0 µm, a first width 1312 of 15 µm, a length 1314 of 6.5 µm, a second width 1316 of 6.86 µm, and a radius of rotation 1318 of 15 µm.

Figure 14B:
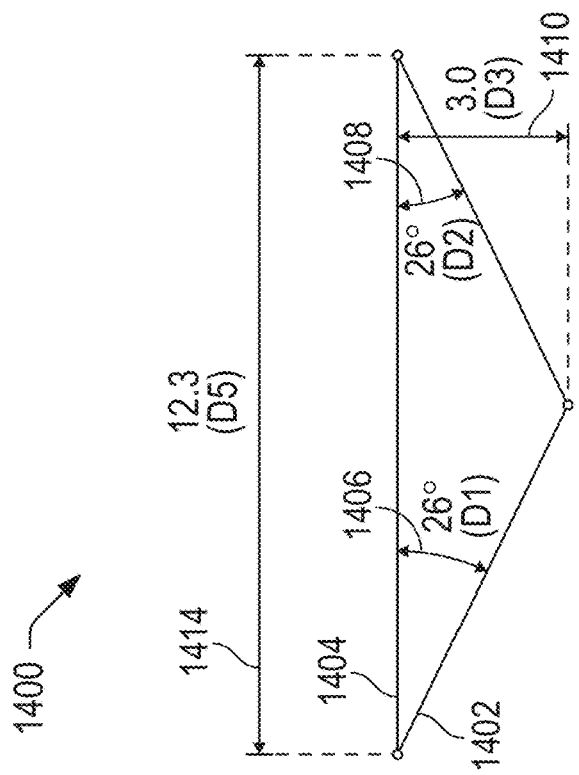
FIG. 14B-14C illustrate cross-section views of the extraction feature of FIG. 14A, in accordance with one or more example embodiments of the present disclosure.
Figure 14A:
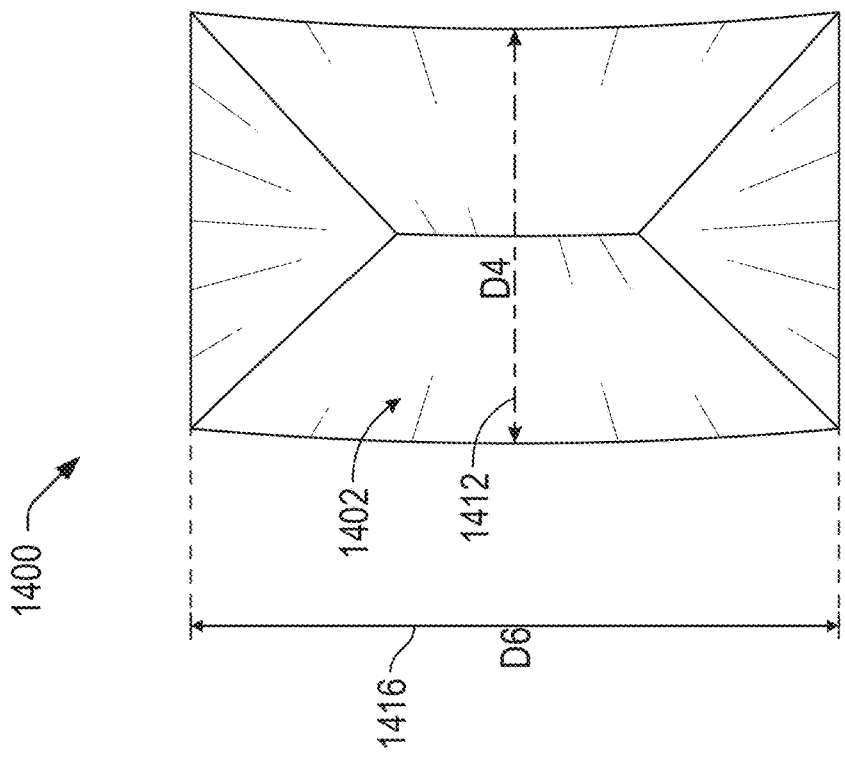
FIG. 14A illustrates a bottom-up view of another extraction feature of a light guide of the device of FIG. 1, in accordance with one or more example embodiments of the present disclosure.
Figure 14C:
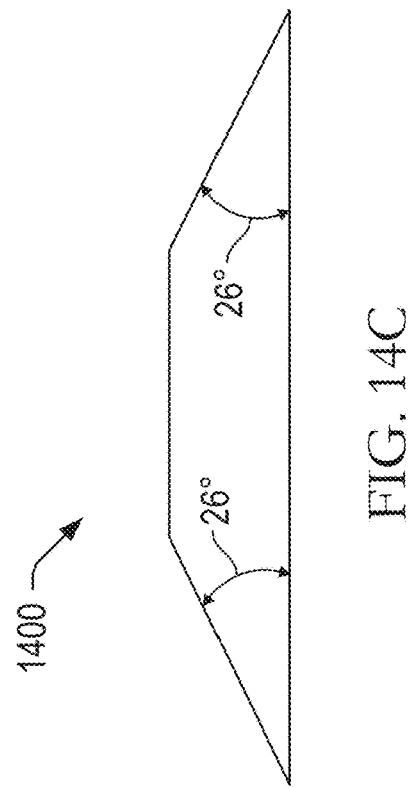

FIGS. 14A-14C show another example of an extraction feature 1400. FIG. 14A shows a bottom-up view of the extraction feature 1400 and FIGS. 14B-14C shows a cross-section of a side view of the extraction feature 1400. The extraction feature 1400 is more symmetrical than the extraction features 900, 1000, 1100, 1200, and 1300. Similar to the extraction feature 900, the extraction feature 1400 may include a wedge angle 1406 between 26 and 31 degrees. In one or more embodiments, the extraction feature 1400 also may also be characterized by a side angle 1408 of 26-31 degrees, a height 1410 of 3.0 µm, a first width 1412 of 12.3 µm, a length 1414 of 6.5 µm, and a second width 1416 of 19.3 µm.

Figure 15A:
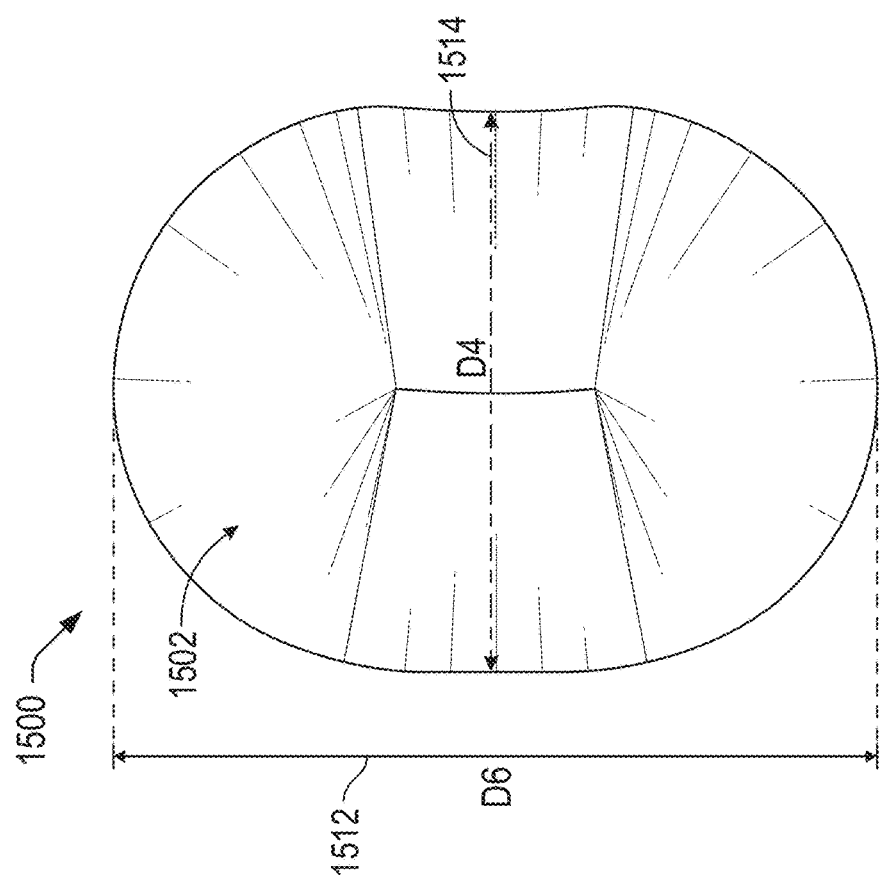
FIG. 15A illustrates a bottom-up view of another extraction feature of a light guide of the device of FIG. 1, in accordance with one or more example embodiments of the present disclosure.
Figure 15C:
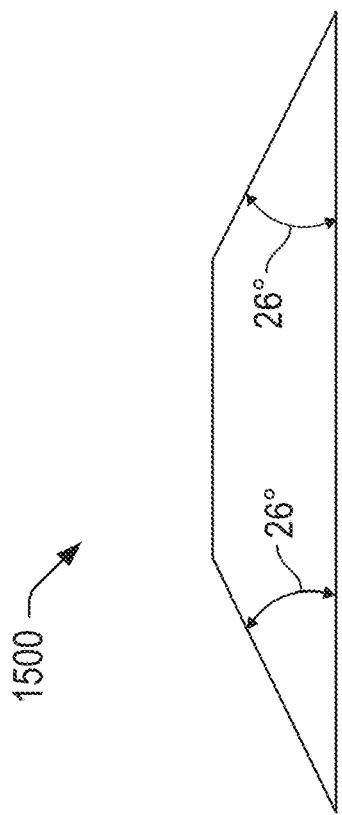
FIGS. 15B-15C illustrate cross-section views of the extraction feature of FIG. 15A, in accordance with one or more example embodiments of the present disclosure.
Figure 15B:
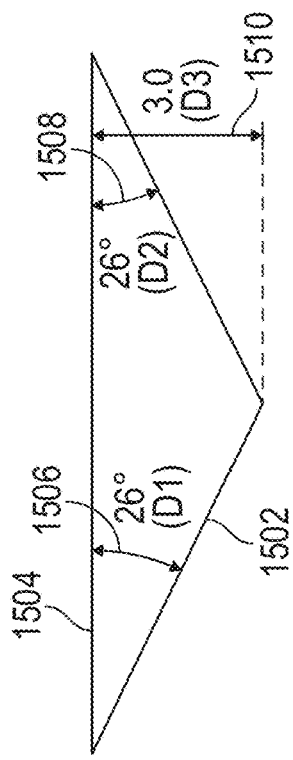

FIGS. 15A-15C show another example of an extraction feature 1500. FIG. 15A shows a bottom-up view of the extraction feature 1500 and FIGS. 15B-15C shows a cross-section of a side view of the extraction feature 1500. Similar to the extraction feature 1400, the extraction feature 1500 is more symmetrical than the extraction features 900, 1000, 1100, 1200, and 1300, however, the extraction feature 1500 is more rounded than the extraction feature 1400. Similar to the extraction feature 900, the extraction feature 1500 may include a wedge angle 1506 between 26 and 31 degrees. In one or more embodiments, the extraction feature also may also be characterized by a side angle 1508 of 26-31 degrees, a height 1510 of 4.0 µm, a width 1512 of 22 µm, a length 1514 of 16 µm.

The dimensions (for example, height, widths, etc.) described in association with the extraction features shown in FIGS. 9A-15C are merely exemplary and other dimensions may also be possible. Additionally, as aforementioned, a light guide may be provided with extraction features of differing sizes and/or shapes. That is, some of the extraction features provided on the light guide may not necessarily have a wedge angle between 26 and 31 degrees.

In some configurations, extraction features with larger wedge angles (for example, wedge angles up to 37 degrees) may be provided closer to the light source (for example, LEDs or any other type of light source). These extraction features with larger wedge angles may provide for more precise mixing of white and amber light. This is because the direction of the extracted light is closer to the normal to the display surface. This allows more careful placement of the light extracted from a single feature. As a more specific example, in some instances, the extraction features of FIGS. 8C-8D may be provided closer to the light source and the extraction features of FIGS. 8A-8B may be provided at a greater distance from the light source. However, this is merely an example of a manner in which this precise mixing may be performed. Other manners in which the white and amber light may be precisely mixed may involve adjusting the angle and/or curvature of extraction features.

Extraction features provided further towards the middle and the far end of the display stack relative to the light sources may then be provided with the wedge angle between the 26-to-31 degree range may then be provided. As a specific example, 20% of the extraction features proximate to the light sources may be extraction features with these larger angles and 80% of the extraction features may have the wedge angle between 26-to-31 degrees. However, any other combination of extraction features with these varying angles may also be provided.

Figure 16:
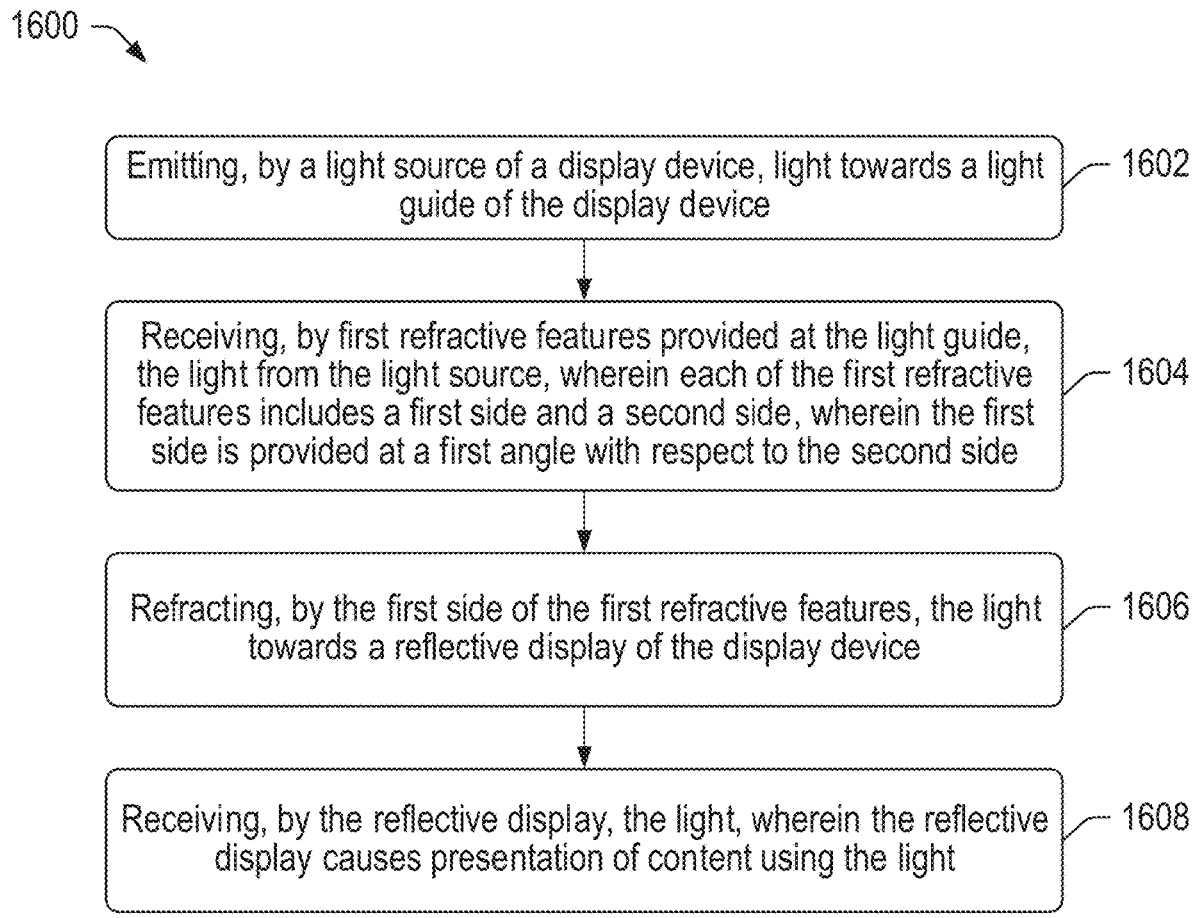
FIG. 16 illustrates a flow diagram for a process with one implementation of the device of FIG. 1, in accordance with one or more example embodiments of the present disclosure.

FIG. 16 illustrates a flow diagram for a process 1600 for using a frontlight display with one implementation of the device 102 of FIG. 1, in accordance with one or more example embodiments of the present disclosure. At block 1602, a light source of a display device (for example, device 102) emits light towards a light guide (for example, light guide 604, light guide 710, etc.) of the display device. At block 1604, first extraction features (for example, extraction feature 610, extraction feature 614, extraction feature 900, extraction feature 1000, extraction feature 1100, extraction feature 1200, extraction feature 1300, extraction feature 1400, extraction feature 1500, etc.) provided at the light guide receive the light from the light source, wherein each of the first extraction features includes a first side and a second side, wherein the first side is provided at a first angle (for example, wedge angle 906, wedge angle 1006, wedge angle 1106, wedge angle 1206, wedge angle 1306, wedge angle 1406, wedge angle 1506, etc.) with respect to the second side. At block 1606, the first extraction features refract the light towards a reflective display (for example, reflective LCD 608, etc.) of the display device. At block 1608 the reflective display device receives the light, wherein the reflective display causes presentation of content using the light.

Figure 17:
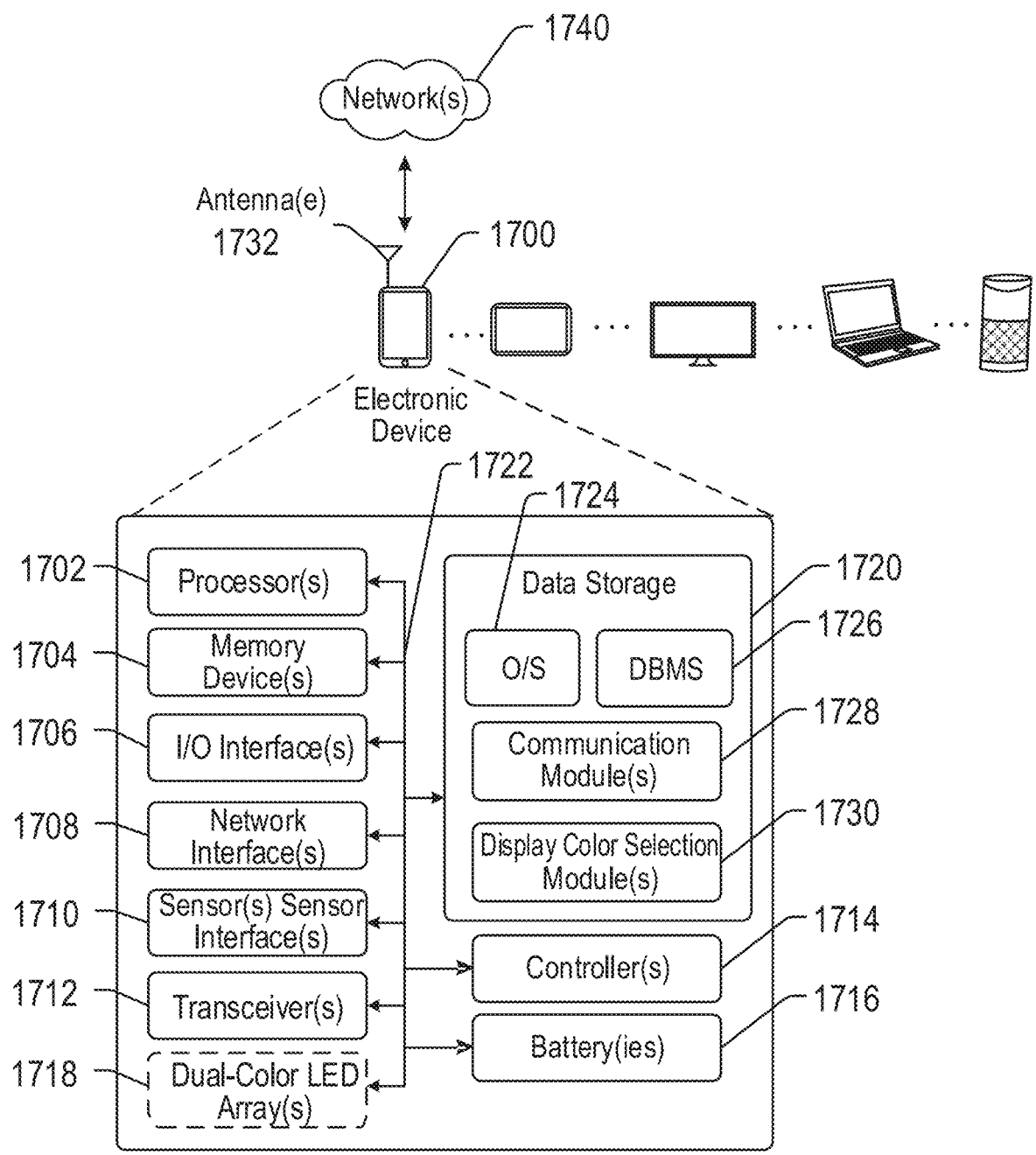
FIG. 17 schematically illustrates an example architecture of an electronic device in, accordance with one or more embodiments of the disclosure.

FIG. 17 is a schematic block diagram of one or more illustrative electronic device(s) 1700 in accordance with one or more example embodiments of the disclosure.

The electronic device(s) 1700 may include any suitable computing device including, but not limited to, a server system, a camera or camera system, a mobile device such as a smartphone, a tablet, an e-reader, a wearable device, a speaker device, or the like; a desktop computer; a laptop computer; a content streaming device; a set-top box; or the like. The electronic device(s) 1700 may correspond to an illustrative device configuration for the electronic device(s) of FIGS. 1-16.

The electronic device(s) 1700 may be able to communicate via one or more networks with one or more servers, user devices, or the like. The electronic device(s) 1700 may have a battery that is configured to prevent swelling or other damage, which may prevent damage to the electronic device (s) 1700. The electronic device(s) 1700 may be able to select one or more wireless communication protocols, and control operations of remote devices, such an internet of things devices, and other operations.

The electronic device(s) 1700 may be configured to communicate via one or more networks 1740. Such network (s) 1740 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) 1740 may have any suitable communication range associated therewith and may include, for example, global networks (e.g., the Internet), metropolitan area networks (MANs), wide area networks (WANs), local area networks (LANs), or personal area networks (PANs). In addition, such network(s) 1740 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device(s) 1700 may include one or more processors (processor(s)) 1702, one or more memory devices 1704 (generically referred to as memory 1704), one or more input/output (I/O) interfaces 1706, one or more network interfaces 1708, one or more sensors or sensor interfaces 1710, one or more transceivers 1712, one or more controllers 1714, one or more batteries 1716, one or more optional dual-color LED array(s) 1718, and data storage 1720. The electronic device(s) 1700 may further include one or more buses 1722 that functionally couple various components of the electronic device(s) 1700. The electronic device(s) 1700 may optionally include one or more antenna (e) 1732 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, an RFID antenna, and so forth.

The bus(es) 1722 may include at least one of a system bus, a memory bus, an address bus, or a message bus, and may permit the exchange of information (e.g., data (including computer-executable code), signaling, etc.) between various components of the electronic device(s) 1700. The bus(es) 1722 may include, without limitation, a memory bus or a memory controller, a peripheral bus, an accelerated graphics port, and so forth. The bus(es) 1722 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 1704 of the electronic device(s) 1700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1720 may include removable storage and/or non-removable storage including, but not limited to, magnetic storage, optical disk storage, and/or tape storage. The data storage 1720 may provide non-volatile storage of computer-executable instructions and other data. The memory 1704 and the data storage 1720, removable and/or nonremovable, are examples of computer-readable storage media (CRSM) as that term is used herein.

The data storage 1720 may store computer-executable code, instructions, or the like that may be loadable into the memory 1704 and executable by the processor(s) 1702 to cause the processor(s) 702 to perform or initiate various operations. The data storage 1720 may additionally store data that may be copied to the memory 1704 for use by the processor(s) 1702 during the execution of the computer-executable instructions. Moreover, output data generated as a result of execution of the computer-executable instructions by the processor(s) 1702 may be stored initially in the memory 1704, and may ultimately be copied to the data storage 1720 for non-volatile storage.

More specifically, the data storage 1720 may store one or more operating systems (O/S) 1724; one or more database management systems (DBMS) 1726; and one or more program module(s), applications, engines, computer-executable code, scripts, or the like such as, for example, one or more communication module(s) 1728 and/or one or more display color selection module(s) 1730. Some or all of these module(s) may be or include sub-module(s).

Any of the components depicted as being stored in data storage 1720 may include any combination of software, firmware, and/or hardware. The software and/or firmware may include computer-executable code, instructions, or the like that may be loaded into the memory 1704 for execution by one or more of the processor(s) 1702. Any of the components depicted as being stored in data storage 1720 may support the functionality described in reference to the corresponding components named earlier in this disclosure.

The data storage 1720 may further store various types of data utilized by the components of the electronic device(s) 1700. Any data stored in the data storage 1720 may be loaded into the memory 1704 for use by the processor(s) 1702 in executing computer-executable code. In addition, any data depicted as being stored in the data storage 1720 may potentially be stored in one or more datastore(s) and may be accessed via the DBMS 1726 and loaded in the memory 1704 for use by the processor(s) 1702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 17, an example datastore(s) may include, for example, user account or user profile data, user device or battery settings, user device preferences and authorizations, and other information.

The processor(s) 1702 may be configured to access the memory 1704 and execute the computer-executable instructions loaded therein. For example, the processor(s) 1702 may be configured to execute computer-executable instructions of the various program module(s), applications, engines, or the like of the electronic device(s) 1700 to cause or facilitate various operations to be performed in accordance with one or more embodiments of the disclosure.

The processor(s) 1702 may include any suitable processing unit capable of accepting data as input, processing the input data in accordance with stored computer-executable instructions, and generating output data. The processor(s) 1702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an Image Signal Processor (ISP), a digital signal processor (DSP), and so forth. Further, the processor(s) 1702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1702 may be capable of supporting any of a variety of instruction sets.

Referring now to functionality supported by the various program module(s) depicted in FIG. 17, the communication module(s) 1728 may include computer-executable instructions, code, or the like that responsive to execution by one or more of the processor(s) 1702 may perform functions including, but not limited to, communicating with remote servers or devices, communicating with remote datastores, communicating with local servers or devices on an intranet, sending or receiving information and instructions, sending or receiving orders, sending and receiving content, and the like.

The display color selection module(s) 1730 may include computer-executable instructions, code, or the like that responsive to execution by one or more of the processor(s) 1702 may perform functions including, but not limited to, determining an LED color to activate, determining one or more LED colors to use, controlling operation of one or more LEDs or LED arrays, and the like.

Referring now to other illustrative components depicted as being stored in the data storage 1720, the O/S 1724 may be loaded from the data storage 1720 into the memory 1704 and may provide an interface between other application software executing on the electronic device(s) 1700 and the hardware resources of the electronic device(s) 1700. More specifically, the O/S 1724 may include a set of computer-executable instructions for managing the hardware resources of the electronic device(s) 1700 and for providing common services to other application programs (e.g., managing memory allocation among various application programs). In certain example embodiments, the O/S 1724 may control execution of the other program module(s) to dynamically enhance characters for content rendering. The O/S 1724 may include any operating system now known or which may be developed in the future including, but not limited to, any server operating system, any mainframe operating system, or any other proprietary or non-proprietary operating system.

The DBMS 1726 may be loaded into the memory 1704 and may support functionality for accessing, retrieving, storing, and/or manipulating data stored in the memory 1704 and/or data stored in the data storage 1720. The DBMS 1726 may use any of a variety of database models (e.g., relational model, object model, etc.) and may support any of a variety of query languages. The DBMS 1726 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device(s) 1700 is a mobile device, the DBMS 1726 may be any suitable light-weight DBMS optimized for performance on a mobile device.

Referring now to other illustrative components of the electronic device(s) 1700, the input/output (I/O) interface(s)

1706 may facilitate the receipt of input information by the electronic device(s) 1700 from one or more I/O devices as well as the output of information from the electronic device(s) 1700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device(s) 1700 or may be separate. The I/O devices may further include, for example, any number of peripheral devices such as data storage devices, printing devices, and so forth.

The I/O interface(s) 1706 may also include an interface for an external peripheral device connection such as universal serial bus (USB), micro-USB, FireWire, Thunderbolt, Ethernet port or other connection protocol that may connect to one or more networks. The I/O interface(s) 1706 may also include a connection to one or more of the antenna (e) 1732 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, a WiMAX network, a 3G network, a ZigBee network, etc.

The electronic device(s) 1700 may further include one or more network interface(s) 1708 via which the electronic device(s) 1700 may communicate with any of a variety of other systems, platforms, networks, devices, and so forth. The network interface(s) 1708 may enable communication, for example, with one or more wireless routers, one or more host servers, one or more web servers, and the like via one or more networks.

The optional antenna (e) 1732 may include any suitable type of antenna depending, for example, on the communications protocols used to transmit or receive signals via the antenna (e) 1732. Non-limiting examples of suitable antennae may include directional antennae, non-directional antennae, dipole antennae, folded dipole antennae, patch antennae, multiple-input multiple-output (MIMO) antennae, or the like. The antenna (e) 1732 may be communicatively coupled to one or more transceivers 1712 or radio components to which or from which signals may be transmitted or received.

As previously described, the antenna (e) 1732 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna (e) 1732 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11 g, 802.11n), 5 GHz channels (e.g., 802.11n, 802.11ac), or 60 GHz channels (e.g., 802.11ad). In alternative example embodiments, the antenna (e) 1732 may be able to transmit or receive radio frequency signals within any suitable frequency range forming part of the unlicensed portion of the radio spectrum.

The antenna (e) 1732 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1712 may include any suitable radio component(s) for—in cooperation with the antenna (e) 1732—transmitting or receiving radio frequency (RF) signals in the bandwidth and/or channels corresponding to the communications protocols utilized by the electronic device(s) 1700 to communicate with other devices. The transceiver(s) 1712 may include hardware, software, and/or firmware for modulating, transmitting, or receiving—potentially in cooperation with any of antenna (e) 1732—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards.

The transceiver(s) 1712 may further include hardware, firmware, or software for receiving GNSS signals. The transceiver(s) 1712 may include any known receiver and baseband suitable for communicating via the communications protocols utilized by the electronic device(s) 1700. The transceiver(s) 1712 may further include a low noise amplifier (LNA), additional power signal amplifiers (PA), an analog-to-digital (A/D) converter, one or more buffers, a digital baseband, or the like.

The controller(s) 1714 may be any microcontroller or microprocessor able to control one or more operations of the electronic device(s) 1700. The battery(ies) 1716 may be a swelling resistant pouch battery able to power the electronic device(s) 1700. For example, the battery 1716 may be a lithium-ion battery. The battery 1716 may be coupled to the one or more optional dual-color LED array(s) 1718. The one or more optional dual-color LED array(s) 1718 may include one or more LED colors, such as amber colored LEDs, cool white LEDs, and other LED colors, and may include LEDs having a specific arrangement, such as an alternating arrangement, a separated arrangement, or another arrangement.

The sensor(s)/sensor interface(s) 1710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 17 as being stored in the data storage 1720 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device(s) 1700, and/or hosted on other computing device(s) accessible via one or more networks, may be provided to support the functionality provided by the program module(s), applications, or computer-executable code depicted in FIG. 17 and/or additional or alternate functionality. Further, functionality may be modularized differently such that processing described as being supported collectively by the collection of program module(s) depicted in FIG. 17 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 17 may be implemented, at least partially, in hardware and/or firmware across any number of devices.

It should further be appreciated that the electronic device(s) 1700 may include alternate and/or additional hardware, software, or firmware components beyond those described or depicted without departing from the scope of the disclosure. More particularly, it should be appreciated that software, firmware, or hardware components depicted as forming part of the electronic device(s) 1700 are merely illustrative and that some components may not be present or additional components may be provided in various embodiments. While various illustrative program module(s) have been depicted and described as software module(s) stored in the data storage 1720, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, schematics, and use cases of FIGS. 1-16 may be performed by a device having the illustrative configuration depicted in FIG. 17, or more specifically, by one or more engines, program module(s), applications, or the like executable on such a device. It should be appreciated, however, that such operations may be implemented in connection with numerous other device configurations.

The processes described and shown above may be carried out or performed in any suitable order as desired in various implementations. Additionally, in certain implementations, at least a portion of the processes may be carried out in parallel. Furthermore, in certain implementations, less than or more than the processes described may be performed.

Certain aspects of the disclosure are described above with reference to flow diagrams of methods, apparatuses, or computer program products according to various implementations. It will be understood that one or more blocks of the flow diagrams, and combinations of blocks in the flow diagrams, can be implemented by computer-executable program instructions. Likewise, some blocks of the flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the flow diagrams support combinations of means for performing the specified functions, combinations of elements or steps for performing the specified functions and program instruction means for performing the specified functions. It will also be understood that each block of the flow diagrams, and combinations of blocks in the flow diagrams, can be implemented by special-purpose, hardware-based computer systems that perform the specified functions, elements or steps, or combinations of special-purpose hardware and computer instructions.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims.

While aspects and features are sometimes disclosed herein in the context of a liquid crystal display, such disclosed aspects and features are equally intended and disclosed for use with an electrophoretic display.

What is claimed is:

1. A display device, comprising:
a front surface;
a back surface provided opposite to the front surface;
a front light including one or more light emitting diodes (LEDs) configured to emit light to provide illumination for a reflective display, wherein the reflective display is configured to cause presentation of content using the light;
a light guide configured to receive the light from the one or more LEDs, wherein the light guide includes first extraction features, wherein each of the first extraction features includes a first side and a second side, wherein the first side is provided at a first angle with respect to the second side, wherein the first angle is within a range from 26 to 31 degrees, wherein an edge formed at an intersection of the first side and second side is curved, each of the first extraction features configured to:
receive the light at the first side; and
refract the light from the first side toward the reflective display such that the light interacts with the reflective display at an incidence angle that is less than or equal to 20 degrees from a normal of the reflective display.

2. The display device of claim 1, wherein the light guide further includes second extraction features, wherein each of the second extraction features includes a third side and a fourth side, wherein the third side is provided at a second angle with respect to the fourth side.

3. The display device of claim 2, wherein the second extraction features are provided between the one or more LEDs and the first extraction features.

4. The display device of claim 1, wherein the first extraction features are provided at a top portion of the light guide.

5. A display device, comprising:
a light source;
a light guide positioned to receive light from the light source; and
a display positioned to enable presentation of content using light,
wherein the light guide includes first extraction features, wherein each of the first extraction features includes a first side and a second side, wherein the first side is provided at a first angle with respect to the second side, wherein an edge formed at an intersection of the first side and second side is curved, each of the first extraction features arranged to:
receive light at the first side; and
refract light toward the reflective display.

6. The display device of claim 5, wherein the first angle is within a range from 26 to 31 degrees.

7. The display device of claim 5, wherein the light guide further includes second extraction features, wherein each of the second extraction features includes a third side and a fourth side, wherein the third side is provided at a second angle with respect to the fourth side.

8. The display device of claim 7, wherein the second extraction features are provided between the light source and the first extraction features.

9. The display device of claim 5, wherein the first extraction features are provided at a top portion of the light guide.

10. The display device of claim 5, wherein the first extraction features are formed as air pockets.

11. The display device of claim 5, wherein the first extraction features are formed as a material with a first refractive index that is less than a second refractive index of the light guide.

12. The display device of claim 5, wherein the first extraction features are prism-shaped.

13. A method comprising:
emitting, by a light source of a display device, light towards a light guide of the display device;
receiving, by first extraction features provided at the light guide, the light from the light source, wherein each of the first extraction features includes a first side and a second side, wherein the first side is provided at a first angle with respect to the second side, wherein an edge formed at an intersection of the first side and second side is curved;
refracting, by the first side of the first extraction features, the light towards a display of the display device; and
receiving, by the reflective display, the light, wherein the display causes presentation of content using the light.

14. The method of claim 13, wherein the first angle is within a range from 26 to 31 degrees.

15. The method of claim 13, wherein the light guide further includes second extraction features, wherein each of the second extraction features includes a third side and a fourth side, wherein the third side is provided at a second angle with respect to the fourth side.

16. The method of claim 15, wherein the second extraction features are provided between the light source and the first extraction features.

17. The method of claim 13, wherein the first extraction features are provided at a top portion of the light guide.

18. The method of claim 13, wherein the first extraction features are formed as air pockets.

19. The method of claim 13, wherein the first extraction features are formed as a material with a first refractive index that is less than a second refractive index of the light guide.

20. The method of claim 13, wherein the display is an electrophoretic display.

* * * * *